(12) United States Patent
Yanagihara et al.

(10) Patent No.: US 6,211,800 B1
(45) Date of Patent: Apr. 3, 2001

(54) DATA DECODING SYSTEM AND METHOD, TRANSFER DEVICE AND METHOD, AND RECEIVING DEVICE AND METHOD

(75) Inventors: Naofumi Yanagihara, Tokyo; Mari Horiguchi, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/933,734

(22) Filed: Sep. 23, 1997

(30) Foreign Application Priority Data

Sep. 27, 1996 (JP) .................................................. 8-256837
May 30, 1997 (JP) .................................................. 9-141425

(51) Int. Cl.$^7$ ................................................ H03M 7/00
(52) U.S. Cl. ................................ 341/50; 370/84; 370/60; 348/423; 348/4
(58) Field of Search ............................... 341/50; 370/84, 370/60; 348/423, 460

(56) References Cited

U.S. PATENT DOCUMENTS

| | | | |
|---|---|---|---|
| 5,291,486 | * | 3/1994 | Koyanagi ............................... 370/84 |
| 5,504,757 | * | 4/1996 | Cook et al. ............................. 370/84 |
| 5,566,174 | * | 10/1996 | Sato et al. .............................. 370/84 |
| 5,596,581 | * | 1/1997 | Saeijs et al. ........................... 370/394 |
| 5,619,337 | * | 4/1997 | Naimpally ............................. 386/83 |
| 5,621,898 | * | 4/1997 | Wooten .................................. 395/97 |
| 5,675,139 | * | 10/1997 | Fama ..................................... 235/472 |
| 5,933,430 | * | 8/1999 | Osakabe et al. ..................... 370/395 |
| 5,953,674 | * | 9/1999 | Hutchinson, IV ................... 455/557 |

FOREIGN PATENT DOCUMENTS

835029 * 4/1998 (JP) ................................ H04N/7/24

* cited by examiner

*Primary Examiner*—Peguy Jean Pierre
(74) *Attorney, Agent, or Firm*—Frommer Lawrence & Haug, LLP.; William S. Frommer; Joe H. Shallenburger

(57) ABSTRACT

Data that is an MPEG program stream (PS) read out from a disc is supplied to a PS/TS converter via a variable rate control section. The PS/TS converter converts the PS MPEG data into a transport stream (TS) and transmits it to a presentation device via a 1394 transmission/reception section. Data received by a 1394 transmission/reception section of the presentation device is classified by a DEMUX section. An audio decoder and a video decoder decode the TS MPEG data. D/A converters convert resulting digital data into analog signals and output the analog signals.

60 Claims, 20 Drawing Sheets

FIG. 7

| CTS | CT/RC | HA | OPC | OPR | OPR | OPR |
|---|---|---|---|---|---|---|
| "0"h | KIND OF REQUEST | DESTINATION IN APPARATUS | COMMAND | PARAMETER 1 | PARAMETER 2 | PARAMETER 3 |

FIG. 9A

| CTS | CT/RC | HA | OPC | OPR | OPR | OPR |
|---|---|---|---|---|---|---|
| "0"h | KIND OF RESPONSE | SENDER IN APPARATUS | PROCESSED COMMAND | PARAMETER 1 | PARAMETER 2 | PARAMETER 3 |

| stream_id | stream coding |
|---|---|
| 110x0***b | MPEG audio stream *** = Decoding Audio stream number |
| 11100000b | Video stream |
| 10111101b | private_stream_1 |
| 10111111b | private_stream_2 |
| Others | no use |

FIG. 13

| sub_stream_id | stream coding |
|---|---|
| 001*****b | Sub_picture stream ***** = Decoding Sub_picture stream number |
| 01001000b | reserved |
| 011*****b | reserved (for extended Sub_picture) |
| 10000***b | Dolby AC-3 audio stream *** = Decoding Audio stream number |
| 10001***b | DTS audio stream (Option) *** = Decoding Audio stream number |
| 10010***b | SDDS audio stream (Option) *** = Decoding Audio stream number |
| 10100***b | Linear PCM audio stream *** = Decoding Audio stream number |
| 11111111b | Provider defined stream |
| Others | reserved (for future Presentation Data) |

FIG. 20

| bit | TS PACKET HEADER ITEM | WITHOUT PCR | WITH PCR |
|---|---|---|---|
| 8 | (transport_packet) sync_byte | 010000111 | 010000111 |
| 1 | transport_error_indicator | 0/1 | 0/1 |
| 1 | payload_unit_start_indicator | 0/1 | 0/1 |
| 1 | transport_priority | 0 | 0 |
| 13 | PID | 0020(ex.video) | 0020(ex.video) |
| 2 | transport_scrambling_control | 00 | 00 |
| 2 | adaptation_field_control | 01 | 00 |
| 4 | continuity_counter | xxxx | xxxx |
| 8 | (adaptation field) adaptation_field_length | | 00000111:7B |
| 1 | discontinuity_indicator | | 0/1 |
| 1 | random_access_indicator | | 0 |
| 1 | ES_priority_indicator | | 0 |
| 1 | PCR_flag | | 1 |
| 1 | OPCR_flag | | 0 |
| 1 | splicing_point_flag | | 0 |
| 1 | transport_private_data_flag | | 0 |
| 33 | (PCR) program_clock_reference_flag | | xxxxxxxx |
| 6 | reserved | | xxxxxx |
| 9 | PCR_extension | | xxxxxx |
| | stuffing_byte | | |
| | PACKET HEADER LENGTH | 4B | 12B |

FIG. 21

| KIND OF DVD PACKET | PID EXAMPLE | KIND OF DVD PACKET | PID EXAMPLE |
|---|---|---|---|
| VIDEO_PCK | 0x0020 | | |
| AUDIO_PCK (STREAM0) | 0x0021 | AUDIO_PCK (STREAM7) | 0x0028 |
| SP_PCK (STREAM0) | 0x0029 | SP_PCK (STREAM31) | 0x0048 |
| PCI_PKT | 0x0049 | | |
| DSI_PKT | 0x004a | | |

DATA DECODING SYSTEM AND METHOD, TRANSFER DEVICE AND METHOD, AND RECEIVING DEVICE AND METHOD

BACKGROUND OF THE INVENTION

The present invention relates to a data decoding system and method, a transfer device and method, and a receiving device and method. In particular, the invention relates to a data decoding system and method, a transfer device and method, and a receiving device and method in which in transmitting data via a digital interface a data form is converted, on a transmission or reception side, to a form suitable for a decoder on the reception side.

The DVD (digital versatile disc)-Video (hereinafter referred to simply as "DVD") has been standardized recently and its spread is now expected. Video data is compressed according to the MPEG (Moving Picture Experts Group) scheme and recorded on a DVD. In a DVD player, a DVD is played back by a drive section and the reproduced data is decoded by a decoding section. Resulting data is output to a TV receiver or the like and pictures corresponding to the data are displayed thereon.

DVD data according to the MPEG scheme is recorded as a program stream that is a program consisting of video information, audio information, and associated data.

FIG. 1 shows an example configuration of a DVD player.

In a DVD player 1, among data that is read out from a disc (DVD) 101, presentation data (compressed as a program stream according to the MPEG scheme) consisting of video data, audio data, and sub-picture data that is associated with the video and audio data is supplied to a presentation engine 12. The presentation engine 12 reproduces those data and output resulting data to a display or the like.

On the other hand, navigation data that is read out from the disc 101 and specifies the order of reproduction, the behavior during a reproduction, and other things is supplied to a navigation manager 11. The navigation manager 11 controls the reproduction of data in the presentation engine 12 in accordance with the navigation data.

Further, the navigation manager 11 receives a signal that corresponds to a user's manipulation and is supplied from a given device (not shown), and executes a process corresponding to that signal, i.e., the user's manipulation.

For example, when the user manipulates a reproduction audio selection key (not shown) to change the audio language from Japanese to English, a signal corresponding to that manipulation is supplied to the navigation manager 11. The navigation manager 11 reads a stream number corresponding to an English audio sub-ID from a table showing a relationship between stream numbers and sub-IDs in navigation data, and outputs the acquired information to the presentation engine 12. Upon reception of that information, the presentation engine 12 changes the language from Japanese to English and outputs corresponding audio data.

FIG. 2 shows an example configuration of the navigation manager 11.

General control data, which is part of navigation data read out from the disc 101, is supplied to a general control section 21. The general control data includes general information of a stream such as the kind of compression mode, the kind of broadcast scheme (NTSC, PAL, or the like), and parental information.

The general control section 21 performs in advance the setting of decoders in the presentation engine 12. For example, the general control section 21 checks the general control data and judges an audio compression scheme (in the DVD, one of MPEG-Audio, Dolby AC-3, and Linear PCM) of data to be reproduced.

Entry search data, which is also part of the navigation data, is supplied to an entry search section 22. The entry search data includes an address table that indicates positions on the disc 101 where PGCI (program chain information) indicating a reproduction procedure of data to be reproduced and presentation data are recorded.

The entry search section 22 selects addresses corresponding to PGCI that is designated by parental information supplied from the general control section 21 and the presentation data.

User interface control data, which is also part of the navigation data, is supplied to a user interface control section 24. The user interface control data is data to prescribe, in accordance with the reproduction position, whether a user's manipulation is allowed or prohibited.

When a user's manipulation is allowed, the user interface control section 24 transfers a signal corresponding to a manipulation to a given circuit (not shown).

Navigation control data, which is also part of the navigation data, is PGCI and supplied to a navigation control section 23.

The navigation control section 23 extracts reproduction order and settings from the supplied PGCI, and outputs the extracted information to the presentation engine 12.

As the navigation manager 11 processes the navigation data in the above manner, the presentation engine 122 operates in accordance with settings that are recorded on the disc 101.

FIG. 3 shows an example configuration of the presentation engine 12.

A DEMUX (demultiplexer) section 31 classifies presentation data that is read out from the disc 101 into an audio pack, a video pack, and sub-picture pack in accordance with a stream ID that is written in a packet header of the presentation data, and outputs those data (packs) to an audio decoder 32, a video decoder 33, and a sub-picture decoder 34, respectively, in accordance with the kinds of data.

Each of the audio decoder 32, the video decoder 33, and the sub-picture decoder 34 decodes the supplied data, and outputs a decoded signal to a D/A converter 41 or a superimposing circuit 36.

A highlight decoder 35 designates a highlight position and color based on highlight information that is supplied from the navigation manager 11, and outputs a highlight picture to the superimposing circuit 36.

The superimposing circuit 36 superimposes a video picture supplied from the video decoder 33, a sub-picture (a caption or the like) supplied from the sub-picture decoder 34, and a highlight picture supplied from the highlight decoder 35, and outputs a superimposed picture to a D/A converter 42.

Each of the D/A converters 41 and 42 converts a supplied digital signal into an analog signal and outputs analog audio and video signals.

As described above, in playing back a DVD, navigation data is processed in addition to presentation data.

On the other hand, in an apparatus that receives digital satellite broadcasts, MPEG data that is transmitted from a broadcasting satellite is received and decoded by a built-in decoder, and pictures/information and sound corresponding to the decoded data are displayed or output. Since the MPEG data is transmitted in the form of a transport stream consisting of a plurality of programs, the above apparatus has a decoder suitable for processing of a transport stream.

However, there is a problem that when it is attempted to process data (MPEG data) of a DVD before decoding and to display or output pictures etc. corresponding to the decoded data by using an apparatus that has a decoder suitable for processing of a transport stream like the above-described apparatus, it is difficult to process the data as received because of a difference in data form (program stream vs. transport stream).

SUMMARY OF THE INVENTION

The present invention has been made in the above circumstances. An object of the invention is therefore to enable an apparatus having a decoder suitable for processing of a transport stream to reproduce data that is recorded on a DVD by converting the data form into a form suitable for a reception-side decoder on a transmission side (DVD player) or a reception side (apparatus having the decoder suitable for processing of a transport stream) in transmitting data via a digital interface.

In a data decoding system according to the invention, a first device or a second device comprises converting means for converting data of a first form into data of a second form; and the second device decodes the data of the second form.

In a data decoding method according to the invention, a first device converts data of a first form into data of a second form and then transmits the data of the second form, or a second device receives the data of the first form and converts it into data of a second form; and the second device decodes the data of the second form.

A data decoding system according to the invention comprises a first device for reproducing data recorded on a given recording medium and for transferring the reproduced data via an IEEE 1394 interface; and a plurality of second devices for receiving the data transferred via the IEEE 1394 interface and for performing digital-to-analog conversion on the received data, to output an analog signal.

A transfer device according to the invention comprises converting means for converting data of a first form into data of a second form that is a data form in a decoder; and transferring means for transferring the data of the second form.

A transfer method according to the invention comprises the steps of converting data of a first form into data of a second form that is a data form in a decoder; and transferring the data of the second form.

A receiving device according to the invention comprises receiving means for receiving data of a first form; converting means for converting the data of the first form into data of a second form that is a data form in a decoder; and decoding means for decoding the data of the second form.

A receiving method according to the invention comprises the steps of receiving data of a first form; converting the data of the first form into data of a second form that is a data form in a decoder; and decoding the data of the second form.

A receiving device according to the invention comprises first decoding means for decoding data of a first form; second decoding means for decoding data of a second form; and supplying means for receiving the data of the first or second form and for supplying the received data to the first decoding means or the second decoding means in accordance with a form of the received data.

A receiving method according to the invention comprises the steps of receiving data of a first form or a second form and for supplying the received data to a first decoding section or a second decoding section in accordance with a form of the received data; decoding the data of the first form in the first decoding section; and decoding the data of the second form in the second decoding section.

In the data decoding system according to the invention, the converting means which is provided in the first or second device converts data of a first form into data of a second form, and the second device decodes the data of the second form.

In the data decoding method according to the invention, the first device converts data of a first form into data of a second form and then transmits the data of the second form, or the second device receives the data of the first form and converts it into data of a second form, and the second device decodes the data of the second form.

In the data decoding system according to the invention, the first device reproduces data recorded on a given recording medium and transfers the reproduced data via an IEEE 1394 interface, and the plurality of second devices receive the data transferred via the IEEE 1394 interface and perform digital-to-analog conversion on the received data, to output an analog signal.

In the transfer device according to the invention, the converting means converts data of a first form into data of a second form that is a data form in a decoder, and the transferring means transfers the data of the second form.

In the transfer method according to the invention, data of a first form is converted into data of a second form that is a data form in a decoder, and the data of the second form is transferred.

In the receiving device according to the invention, the receiving means receives data of a first form, the converting means converts the data of the first form into data of a second form that is a data form in a decoder, and the decoding means decodes the data of the second form.

In the receiving method according to the invention, data of a first form is received, the data of the first form is converted into data of a second form that is a data form in a decoder, and the data of the second form is decoded.

In the receiving device according to the invention, the supplying means receives data of a first form or a second form and supplies the received data to the first decoding means or the second decoding means in accordance with a form of the received data, the first decoding means decodes the data of the first form, and the second decoding means decodes the data of the second form.

In the receiving method according to the invention, data of a first form or a second form is received and supplied to a first decoding section or a second decoding section in accordance with a form of the received data. The data of the first form is decoded in the first decoding section, or the data of the second form is decoded in the second decoding section.

BRIEF DESCRIPTION OF THE DRAWINGS

FIG. 7 shows a command format of a CIP header;

FIGS. 9A and 9B show formats of asynchronous communication;

FIG. 12 shows an example of a correlation between stream ID values and kinds of pack;

FIG. 13 shows an example of a correlation between sub-stream ID values and kinds of pack;

FIG. 20 shows examples of contents of a packet header; and

FIG. 21 shows examples of PIDs for a DVD.

DETAILED DESCRIPTION OF THE PREFERRED EMBODIMENTS

Figure 4:
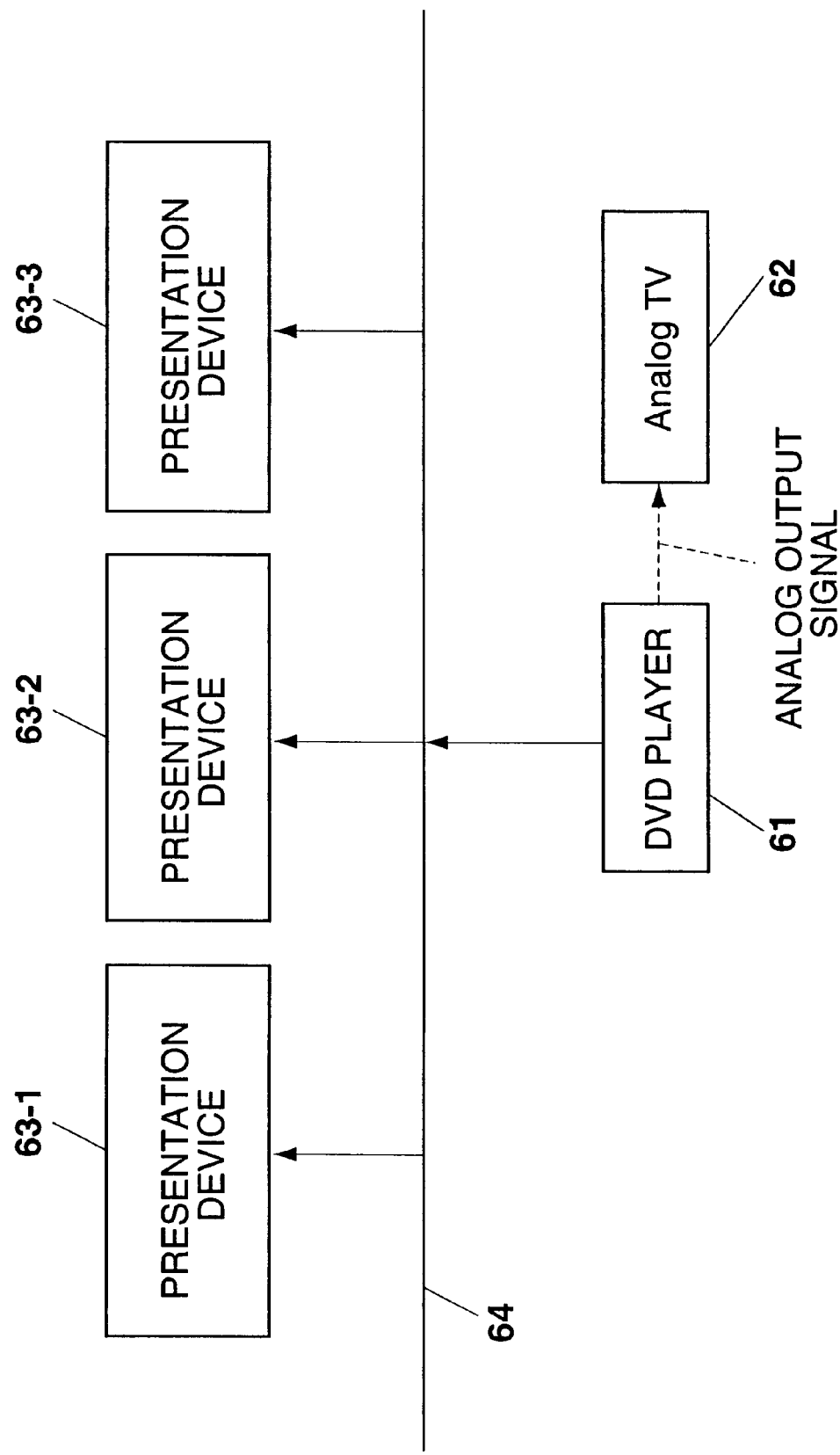
FIG. 4 is a block diagram showing an example configuration of an AV system to which a data decoding system according to the present invention is applied.

FIG. 4 shows an example configuration of an AV system to which a data decoding system according to the present invention is applied. In this AV system, a DVD player 61 plays back a DVD and outputs an analog video signal to an analog television receiver 62, which displays pictures corresponding to the received signal.

A plurality of (in this case, three) presentation devices (for example, set-top boxes (STBs) for digital satellite broadcast) 63-1 to 63-3 are connected to the DVD player 61 via an AV bus 64.

The presentation devices 63-1 to 63-3 decode encoded video data that is supplied from the DVD player 61 via the AV bus 64.

For example, the AV bus 64 is one that is prescribed by the IEEE (The Institute of Electrical and Electronic Engineers) 1394 High Performance Bus Standard.

Figure 5:
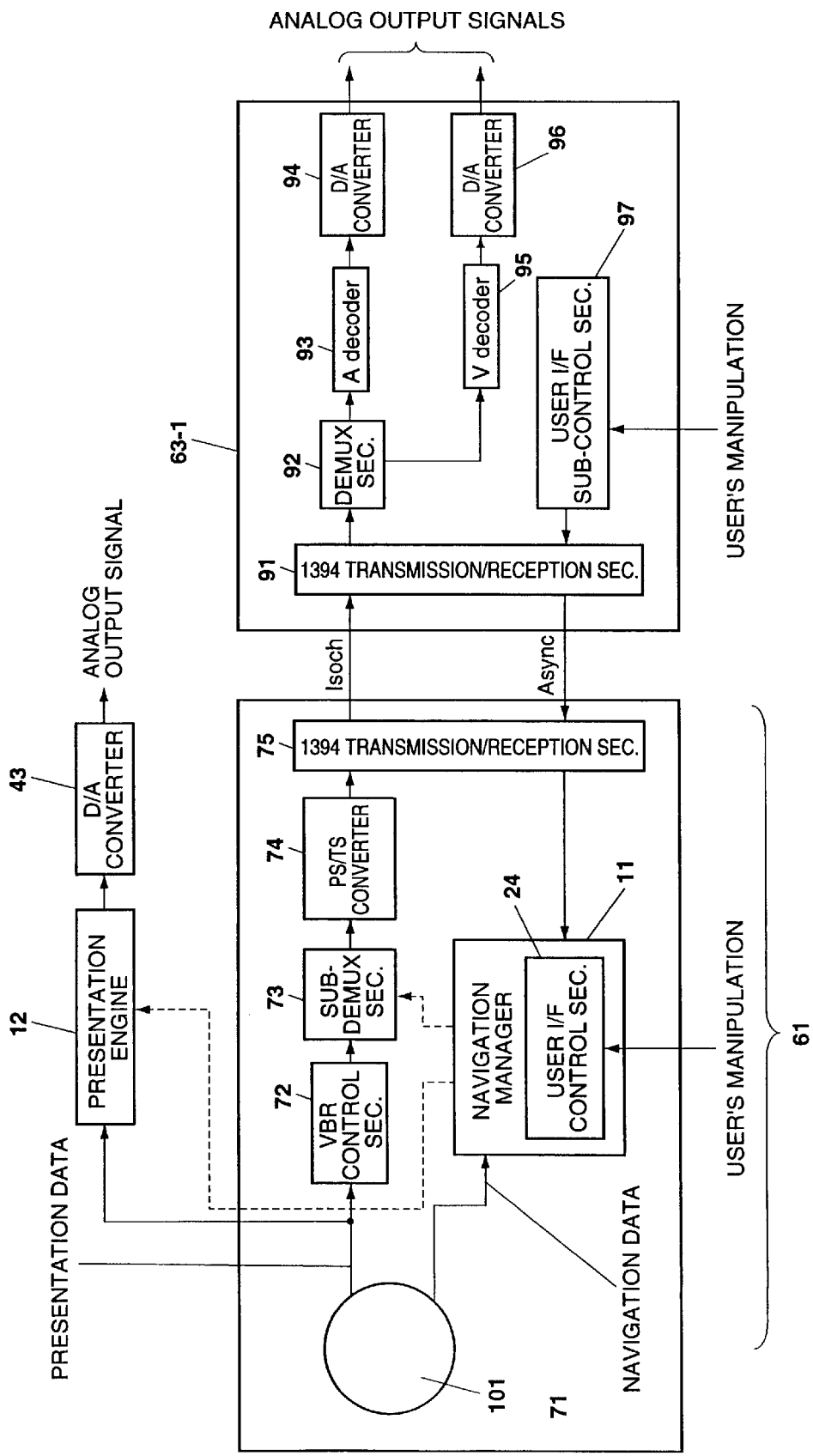
FIG. 5 is a block diagram showing internal configurations of a DVD player 61 and a presentation device 63-1 shown in FIG. 4 according to a first embodiment.

FIG. 5 shows internal configurations of the DVD player 61 and the presentation device 63-1 according to a first embodiment. Although not shown in FIG. 5, the presentation devices 63-2 and 63-3 are configured in the same manner as the presentation device 63-1.

In the DVD player 61 of FIG. 5, presentation data that is an MPEG program stream read out from a disc 101 by a disc drive 71 is supplied to a presentation engine 12 and variable rate control section (VBR control section) 72 whereas navigation data is supplied to a navigation manager 11.

The variable rate control section 72 outputs supplied data to a sub-DEMUX section 73 with such timing that the presentation device 63-1 may immediately decode received data. For example, a variable rate control section disclosed in Japanese Patent Application No. Hei. 8-238781 by the present assignee can be used as the variable rate control section 72.

The sub-DEMUX section 73 judges the kind of supplied data (packs) based on the value of a stream ID that is written in a header of the supplied data. The sub-DEMUX section 73 then eliminates a sub-picture pack and audio packs other than an audio pack designated by the navigation manager 11, and outputs the other packs to a PS/TS converter 74 (converting means).

The program stream (PS) and the transport stream (TS) are prescribed in the ISO/IEC 13818-1 1996 edition as formats of MPEG2.

A program stream is constructed by forming one packet every predetermined hour/minute by multiplexing digital signals of video data, audio data, and additional information data. The length of each packet is variable; its size can be changed in accordance with the data size. Therefore, respective packets have different sizes. For example, a program stream can be realized by making such a presetting that the above data are accommodated in a pack of 2 Kbytes. In this case, if the data cannot be accommodated in 2 Kbytes, a residual portion is accommodated in the next pack. If there remains an unused region, a padding region is added to form a 2-Kbyte pack.

In contrast, packets of a transport stream have a fixed length (size). For example, contents are determined such that each audio packet and each video packet are 188 bytes and a transport stream is constructed by arranging audio packets and video packets in the time axis direction. Since in general video data has a larger size than audio data, a transport stream is constructed by forming one group by 10 video packets, one audio packet, and one additional information packet (12 packets in total), for example.

Therefore, PS-to-TS conversion is realized by sequentially dividing variable-length PS packets into video packets, audio packets, and additional information packets so that they have a fixed length (e.g., 188 bytes) of TS packets and arranging those packets in the time axis direction. In this case, various kinds of headers etc. are added to satisfy the TS packet format.

In the case of playing back disc on which audio data of four languages of Japanese, English, French, and Chinese, for instance, are recorded, packs of all languages recorded on the disc 101 are supplied to the sub-DEMUX section 73 via the variable rate control section 72. Therefore, when Japanese, for instance, is a selected language, the sub-DEMUX section 73 eliminates the unnecessary packs (in this case, audio packs of English, French, and Chinese) to reduce the data transmission amount.

The PS/TS converter 74 converts MPEG data of a program stream that is supplied from the sub-DEMUX section 73 into MPEG data of a transport stream, which is output to a 1394 transmission/reception section 75 (transferring means).

The 1394 transmission/reception section 75 executes an isochronous communication process according to the IEEE 1394 standard, and transmits resulting data to a transmission/reception section 91 (receiving means) of the presentation device 63-1.

Figure 6:
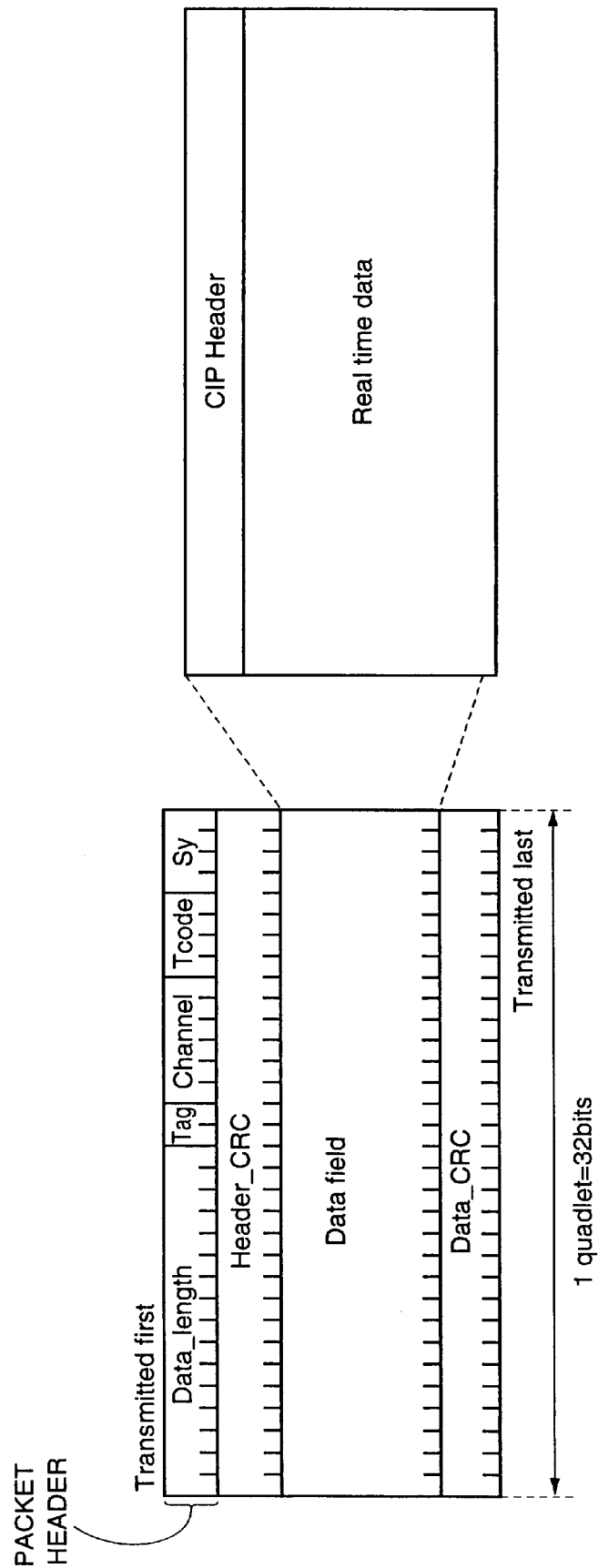
FIG. 6 shows a packet structure of isochronous communication.

FIG. 6 shows a packet structure of isochronous communication. A packet of isochronous communication consists of a packet header, a header CRC, a data field, and a data CRC.

The packet header consists of "Data_length" representing a data length, "Tag" representing the kind of format of data that is transmitted by the packet concerned, "Channel" indicating a channel number (one of 0 to 63) of the packet, "Tcode" representing a process code, and a sync code "Sy" that is prescribed by each application. The header CRC (Header_CRC) is an error correcting code of the packet header and the data CRC (Data_CRC) is an error correcting code of the data field (Data field). The data field consists of a CIP header and a real-time data. The real-time data is a substantial data to be transmitted.

Figure 7:
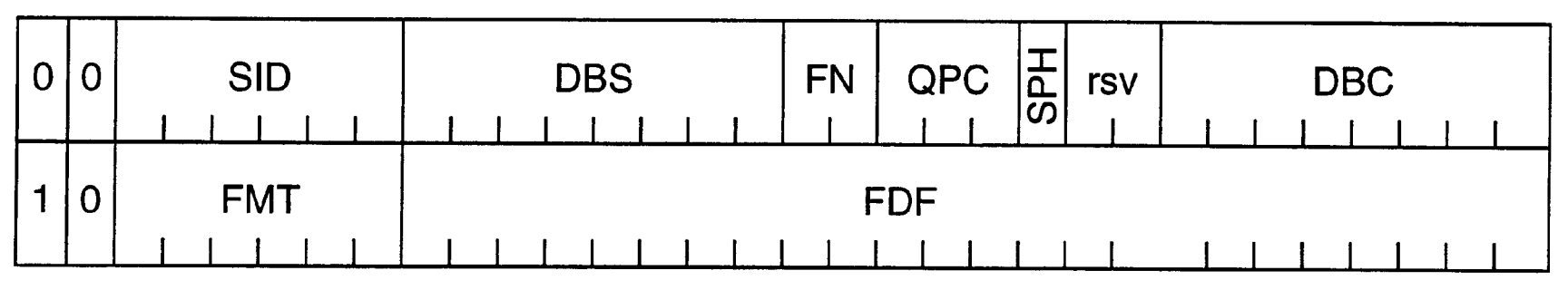

FIG. 7 shows a format of the CIP (common isochronous packet) header. The CIP header consists of a transmission node number SID, a packetizing unit DBS, a packetizing data division number FN, the number QPC of quadlets that were added to make the data length equal to a given fixed length at the time of division (1 quadlet is 4 bytes), a flag SPH of a source packet header, a counter DBC for detecting missing of a packet, a signal format FMT, and a format-dependent field FDF. "rsv" is a reserved region.

The 1394 transmission/reception section 75 receives a signal corresponding to a user's manipulation which signal is generated by a user interface sub-control section 97 of the presentation device 63-1 and transmitted via the 1394 transmission/reception section 91 by an asynchronous communication, and outputs the received signal to the navigation manager 11.

Figure 8:
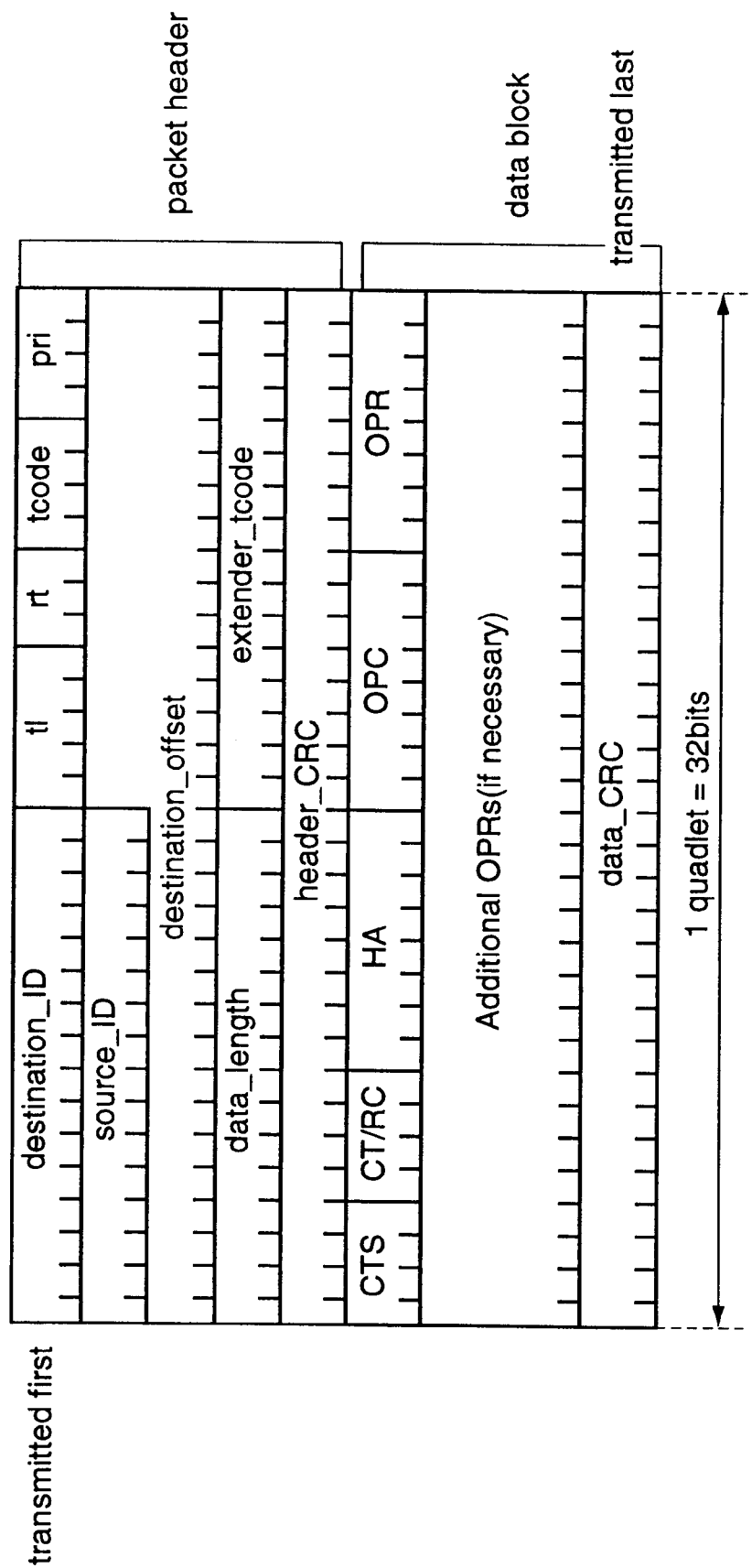
FIG. 8 shows a structure of command and response packets of asynchronous communication.

FIG. 8 shows a structure of command and response packets of asynchronous communication.

Each of these packets consists of a packet header and a data block. In the packet header, "destination_ID" for identification of a destination is provided first and followed by "tl" (transmission level) representing a process label, "rt" (retry code) representing retry reproduction, and "tcode" (transaction code) and "pri" (priority) indicating process codes. Further, "source_ID" representing a transfer source is provided next and followed by "destination_offset" representing low-order 48 bits of a transfer destination address.

Further, "data_length" representing a data length and "extended_tcode" representing other process codes are provided next. Provided last is "header_CRC" that is an error correcting code in the header.

The data block consists of CTS, CT/RC, HA, OPC, OPRs, and "data_CRC" that is an error correcting code in the data. CTS to OPRs are prescribed as shown in FIGS. 9A and 9B. That is, in transferring a command, CTS is set at "0" and CT/RC is given a code representing the kind of request as shown in FIG. 9A. For example, HA is given a destination ID in the apparatus. OPC is given a command to be transferred, and OPRs are given parameters.

In transferring a response, CTS is given "0" and CT/RC is given a code representing the kind of response as shown in FIG. 9B. HA is given an ID of a sender in the apparatus, and OPC is given a code of a processed command. OPRs are given parameters.

As described above, the 1394 transmission/reception section 75, which can perform both isochronous communication and asynchronous communication, transmits data by an isochronous communication and transmits a command and a response by an asynchronous communication.

Figure 10:
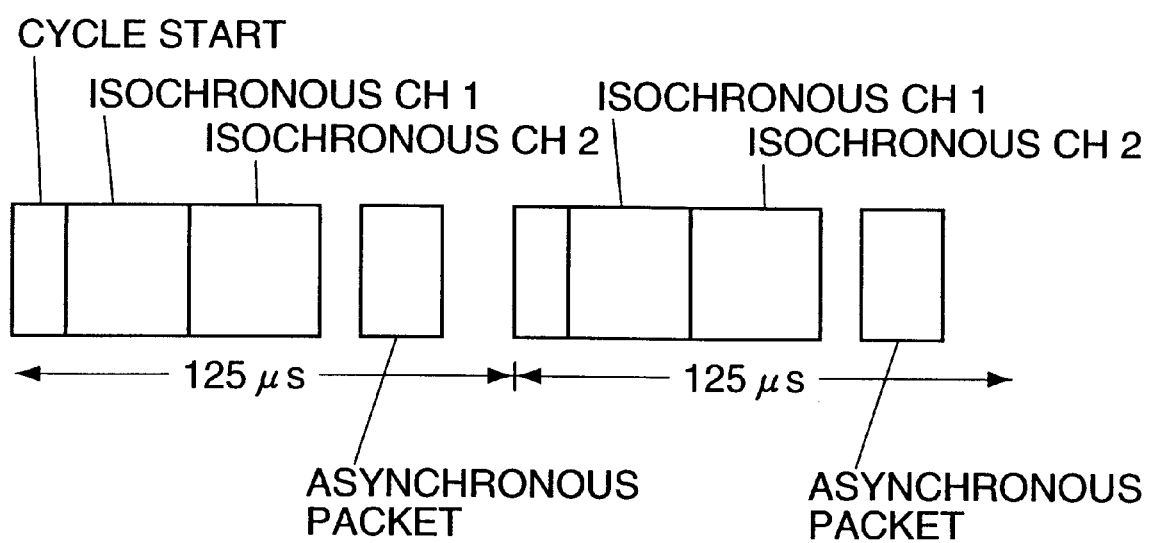
FIG. 10 schematically shows isochronous communication.

FIG. 10 schematically shows isochronous communication. In the isochronous communication, one of AV devices connected to each other via a bus is made a root and the root transmits a cycle start packet at the beginning of each cycle of 125 μs. Each Av device that performs isochronous communication is assigned a particular time zone in each cycle, and transmits data in the assigned time zone with a given channel number. In this manner, in the isochronous communication, communications are performed at constant time intervals.

A method for utilizing by navigation manager 11, through an asynchronous communication, a signal corresponding to a user's manipulation which signal is generated by the user interface sub-control section 97 of the presentation device 63-1 may be one disclosed in Japanese Patent Application No. Hei. 8-238761 by the present assignee.

Since the presentation engine 12 of the DVD player 61 is configured in the same manner as that shown in FIG. 21, a description therefor is omitted here. A D/A converter 43 converts a digital audio signal and a digital video signal that are supplied from the presentation engine 12 into an analog audio signal and an analog video signal, respectively, which are output to the analog television receiver 62.

In the presentation device 63-1 shown in FIG. 5, the 1394 transmission/reception section 91 executes an isochronous communication process according to the IEEE 1394 standard, thereby receiving data transmitted from the DVD player 61 and outputs the received data to a DEMUX section 92.

Further, the 1394 transmission/reception section 91 transmits a signal corresponding to a user's manipulation which signal is generated by the user interface sub-control section 97 of the presentation device 63-1 to the 1394 transmission/reception section 75 of the DVD player 61 through an asynchronous communication.

The DEMUX section 92 judges the kind of supplied data (packs) based on the value of a stream ID that is written in a header of the supplied data, and outputs an audio pack and a video pack to an audio decoder 93 and a video decoder 95, respectively. Since a sub-picture pack and unnecessary audio packs have been eliminated by the sub-DEMUX section 73, only the audio pack and the video pack are supplied to the DEMUX section 92.

The audio decoder 93 decodes an audio pack of an MPEG transport stream that is supplied from the DEMUX section 92 or some other circuit (not shown; for instance, a receiving circuit for digital satellite broadcast), and outputs a decoded digital audio signal to a D/A converter 94.

The video decoder 95 decodes a video pack of an MPEG transport stream that is supplied from the DEMUX section 92 or some other circuit (not shown), and outputs a decoded digital video signal to a D/A converter 96.

The D/A converter 94 D/A-converts the supplied digital audio signal and outputs a resulting analog audio signal to a predetermined device (not shown).

The D/A converter 96 D/A-converts the supplied digital video signal and outputs a resulting analog video signal to the predetermined device.

Next, the operations of the DVD player 61 and the presentation device 63-1 shown in FIG. 5 will be described.

First, the disc drive 71 reads out presentation data and navigation data from the disc 101, and outputs the presentation data to the presentation engine 12 and the variable rate control section 72 and the navigation data to the navigation manager 11.

Then, the variable rate control section 72 outputs the supplied presentation data (audio pack, video pack, and sub-picture pack) to the sub-DEMUX section 73 with such timing that the presentation device 63-1 can immediately decode received data.

The navigation manager 11 outputs such information as a designated language of audio to the sub-DEMUX section 73 and the presentation engine 12 in accordance with the navigation data from the disc 101 and a user's manipulation.

The sub-DEMUX section 73 checks a stream ID of a packet header of the data (pack) supplied from the variable rate control section 72, and judges the kind of pack based on its value.

Figure 11:
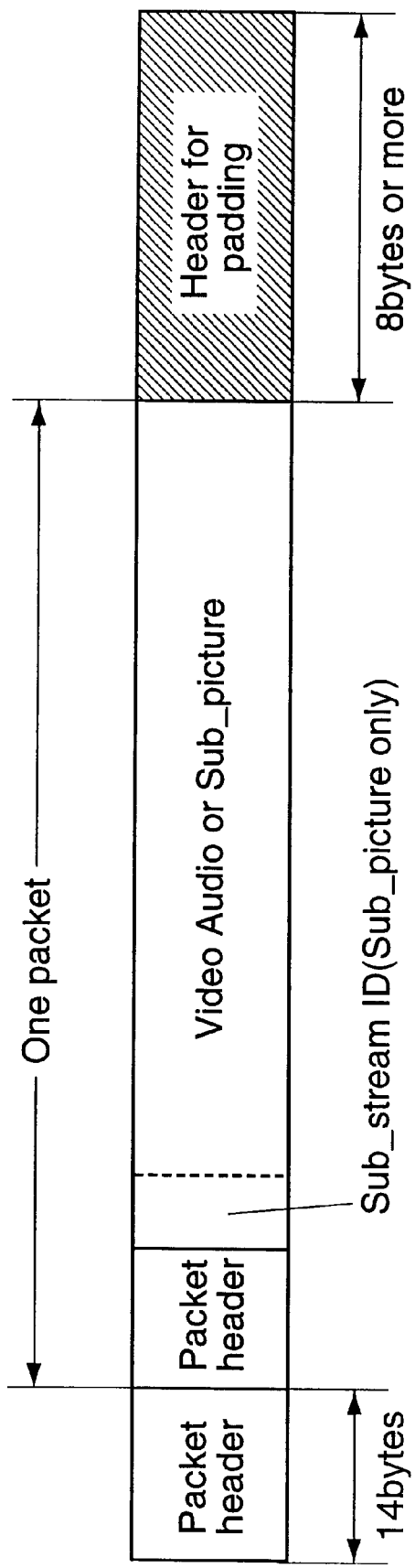
FIG. 11 shows an example of a pack format.

FIG. 11 shows an example of a pack format. In this format, a 14-byte pack header is provided at the head of the pack and followed by a packet header, which is followed by a region of one of video information, audio information, and sub-picture information (compressed). In the case of a sub-picture pack, a sub-stream ID region is provided between the packet header and the sub-picture information region. A padding region (not used for any specific purpose) for making the pack length equal to a given fixed length is provided after the above information.

Each pack is constituted in the above manner. A stream ID is written at a given position (region) of the packet header.

FIG. 12 shows an example of a correlation between stream ID values and kinds of pack.

If the stream ID is "110x0$n_1n_2n_3$b" (b is a binary number, x is 0 or 1, and $n_i$ is 0 or 1), the pack concerned is a pack of an ($n_1n_2n_3$b)th MPEG audio stream, i.e., an audio pack.

If the stream ID is "11100000b," the pack concerned is a pack of a video stream, i.e., a video pack.

If the stream ID is "10111101b," the pack concerned is a pack designated by a sub-stream ID.

FIG. 13 shows an example of a correlation between sub-stream ID values and kinds of pack.

If the sub-stream ID is "0001$n_1n_2n_3n_4n_5$b" ($n_i$ is 0 or 1), the pack concerned is a pack of a ($n_1n_2n_3n_4n_5$b)th sub-picture stream, i.e., a sub-picture pack.

The sub-DEMUX section 73 judges the kind of pack supplied from the variable rate control section 72 by checking the values of the above-mentioned stream ID and sub-stream ID, and eliminates the sub-picture pack and the audio packs other than the audio pack designated by the navigation manager 11 and outputs only the video pack and the audio pack designated by the navigation manager 11 to the PS/TS converter 74.

The PS/TS converter 74 converts the type of supplied MPEG data (pack) from a program stream to a transport stream, and outputs the MPEG data of a transport stream to the 1394 transmission/reception section 75.

The 1394 transmission/reception section 75 outputs the MPEG data of a transport stream to the presentation device 63-1 through an isochronous communication.

In the above manner, the DVD player 61 eliminates given audio packs and a sub-picture pack by using the sub-DEMUX section 73, and converts program stream type MPEG data read out from the disc 101 into transport stream type MPEG data, which is output to the presentation device 63-1.

The 1394 transmission/reception section 91 of the presentation device 63-1 receives the transport stream type MPEG data from the DVD player 61 and outputs it to the DEMUX section 92.

Like the sub-DEMUX section 73 of the DVD player 61, the DEMUX section 92 checks values of a stream ID and a sub-stream ID of the data and judges the kind of data (pack). The DEMUX section 92 outputs the pack to the audio decoder 93 if it is an audio pack, and to the video decoder 95 if it is a video pack.

If the pack concerned is an audio pack, the audio decoder 93 decodes it and outputs a digital audio signal to the D/A converter 94, which converts the digital audio signal to an analog audio signal and outputs it.

On the other hand, if the pack concerned is a video pack, the video decoder 95 decodes it and outputs a digital video signal to the D/A converter 96, which converts the digital video signal into an analog video signal and outputs it.

In the above manner, the presentation device 63-1 decodes transport stream type MPEG data that is supplied from the DVD player 61, thereby reproducing video data and audio data recorded on the disc 101.

As described above, in the above embodiment, in reproducing data recorded on the disc 101 by using the DVD player 61 and the presentation device 63-1, the data type is converted from a program stream to a transport stream in the DVD player 61 and the transport stream type data is decoded in the presentation device 63-1 by the audio decoder 93 or the video decoder 95 depending on the data (audio or video).

Figure 14:
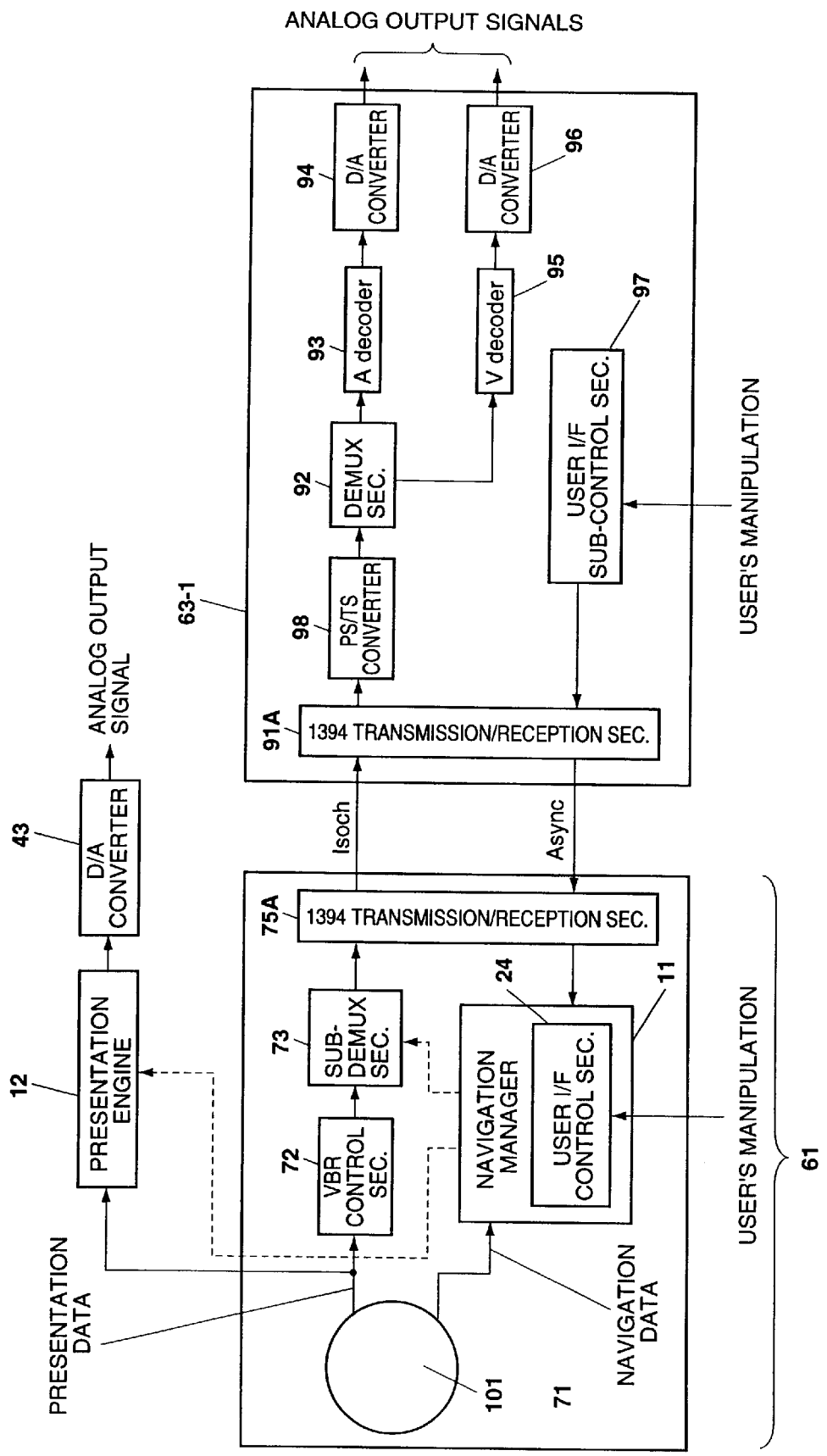
FIG. 14 is a block diagram showing internal configurations of the DVD player 61 and the presentation device 63-1 shown in FIG. 4 according to a second embodiment.

FIG. 14 shows internal configurations of the DVD player 61 and the presentation device 63-1 according to a second embodiment. Although not shown in FIG. 14, the presentation devices 63-2 and 63-3 are configured in the same manner as the presentation device 63-1.

In the DVD player 61, the PS/TS converter 74 of the DVD player 61 of the first embodiment is removed and a 1394 transmission/reception section 75A (transferring means) transfers program stream type MPEG data that is an output of a sub-DEMUX section 73 to the presentation device 63-1 though an isochronous communication.

Since the other components of the DVD player 61 are the same as in the first embodiment, descriptions therefor are omitted here.

In the presentation device 63-1, a 1394 transmission/reception section 91A (receiving means) receives program stream type MPEG data that is transferred from the DVD player 61 and outputs it to a PS/TS converter 98.

The PS/TS converter 98 converts MPEG data of a program stream that is supplied from the 1394 transmission/reception section 91A into MPEG data of a transport stream, which is output to a DEMUX section 92.

Since the other components of the presentation device 63-1 are the same as in the first embodiment, descriptions there for are omitted here.

Since the operation of the second embodiment is the same as that of the first embodiment except that the process of converting the type of MPEG data from a program stream to a transport stream is moved to the presentation device 63-1 side, it is not described here.

Figure 15:
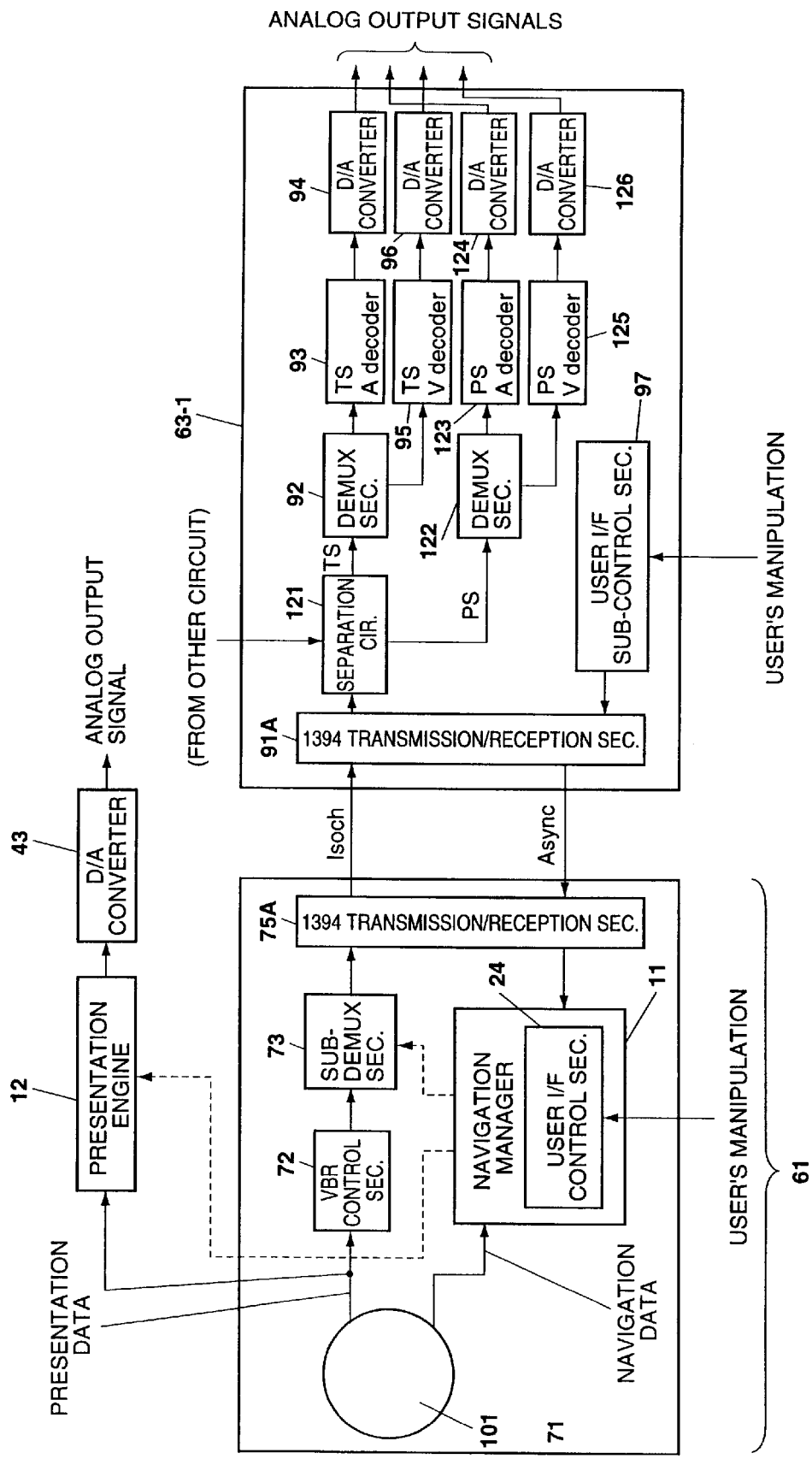
FIG. 15 is a block diagram showing internal configurations of the DVD player 61 and the presentation device 63-1 shown in FIG. 4 according to a third embodiment.

FIG. 15 shows internal configurations of the DVD player 61 and the presentation device 63-1 according to a third embodiment. Although not shown in FIG. 15, the presentation devices 63-2 and 63-3 are configured in the same manner as the presentation device 63-1.

Since the DVD player 61 is the same as that of the second embodiment, it is not described here.

In the presentation device 63-1, the 1394 transmission/reception section 91A receives program stream type MPEG data that is transmitted from the DVD player 61 and outputs it to a separation circuit 121.

The separation circuit 121 (supplying means) outputs MPEG data that is supplied from the 1394 transmission/ reception section 91A or some other circuit (not shown) to a DEMUX section 92 if it is of a transport stream type and to a DEMUX section 122 if it is of a program stream type.

The DEMUX section 122 checks a stream ID and a sub-stream ID of the program stream type MPEG data that is supplied from the separation circuit 121. Based on the values of the stream ID and the sub-stream ID, the DEMUX section 122 outputs an audio pack to an audio encoder 123 (first decoding means) which can deal with data of a program stream and a video pack to a video decoder 125 (first decoding means) which can deal with data of a program stream.

The audio decoder 123 and the video decoder 125 decode the supplied audio pack and video pack and output decoded digital signals to D/A converters 124 and 126, respectively.

The D/A converters 124 and 126 convert the supplied digital audio signal and video signal into analog signals, respectively, and output the analog signals.

Since the other components are the same as in the second embodiment, they are not described here.

Next, the operation of the third embodiment will be described. Since the operation of the DVD player 61 is the same as in the second embodiment, only the operation of the presentation device 63-1 will be described below.

The 1394 transmission/reception section 91A of the presentation device 63-1 receives program stream type MPEG data from the DVD player 61 and outputs it to the separation circuit 121.

The separation circuit 121 outputs supplied MPEG data to the DEMUX section 92 if it is of a transport stream type, and to the DEMUX section 122 if it is of a program stream type.

If the supplied MPEG data is of a transport stream type, the DEMUX section 92 checks values of a stream ID and a sub-stream ID of the data and judges the kind of data (pack). The DEMUX section 92 outputs the pack to the audio decoder 93 if it is an audio pack, and to the video decoder 95 if it is a video pack.

The decoders 93 and 95 (second decoding means) decode the audio pack and the video pack of a transport stream, respectively, and the D/A converters 94 and 96 convert decoded data into analog signals and output the analog signals.

On the other hand, if the supplied MPEG data is of a program stream type (in the case where the data is supplied from the DVD player 61), the DEMUX section 122 checks values of a stream ID and a sub-stream ID of the data and judges the kind of data (pack). The DEMUX section 122 outputs the pack to the audio decoder 123 if it is an audio pack, and to the video decoder 125 if it is a video pack.

The decoders 123 and 125 decode the audio pack and the video pack of a transport stream, respectively, and the D/A converters 124 and 126 convert decoded data into analog signals and output the analog signals.

As described above, the presentation device 63-1 of the third embodiment has two systems of decoders so as to accommodate both types of MPEG data.

Figure 16:
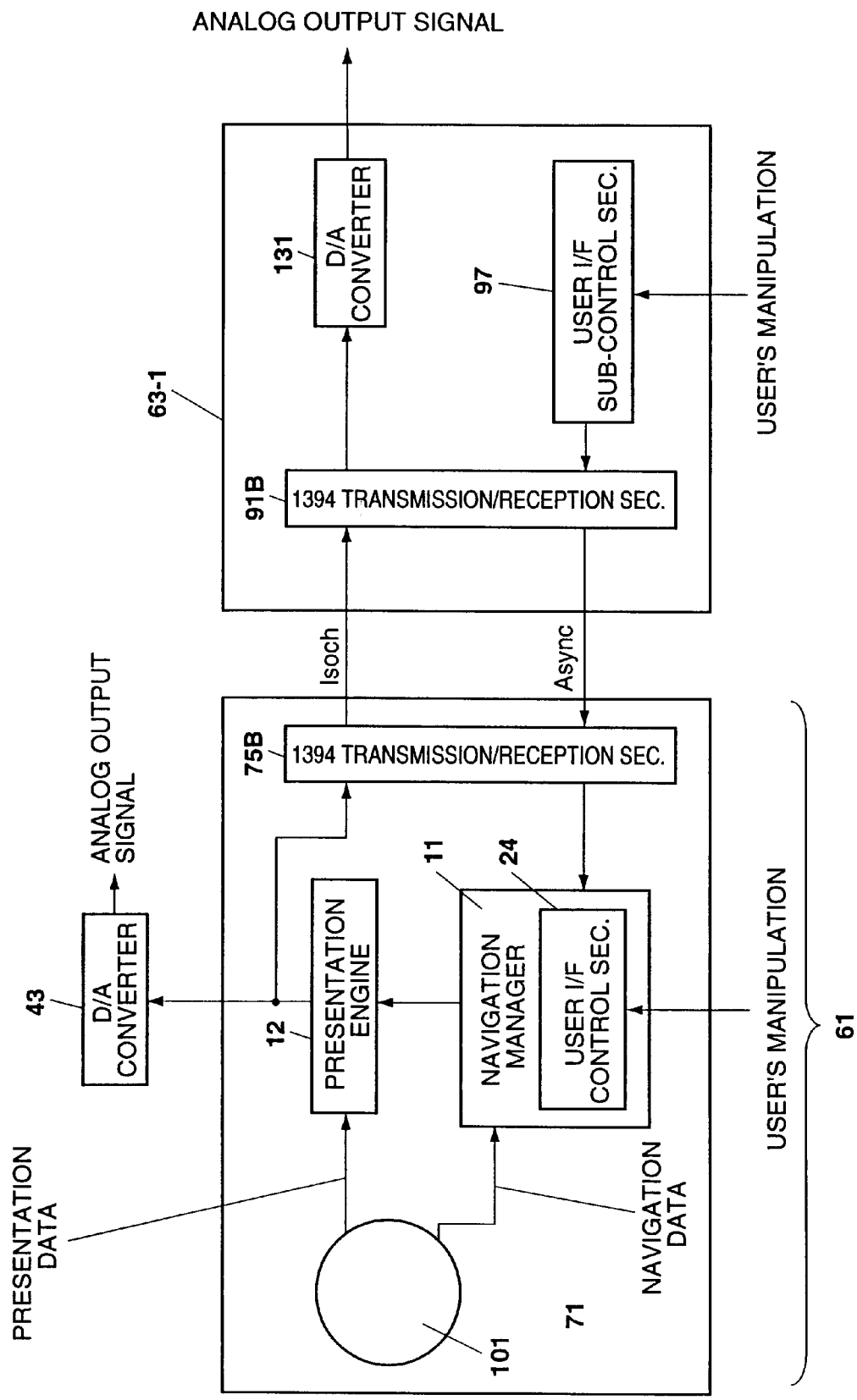
FIG. 16 is a block diagram showing internal configurations of the DVD player 61 and the presentation device 63-1 shown in FIG. 4 according to a fourth embodiment.

FIG. 16 shows internal configurations of the DVD player 61 and the presentation device 63-1 according to a fourth embodiment. Although not shown in FIG. 16, the presentation devices 63-2 and 63-3 are configured in the same manner as the presentation device 63-1.

In the DVD player 61 shown in FIG. 16, presentation data that is an MPEG program stream read out from the disc 101 by the disc drive 71 is supplied to the presentation engine 12 and navigation data is supplied to the navigation manager 11.

Figure 1:
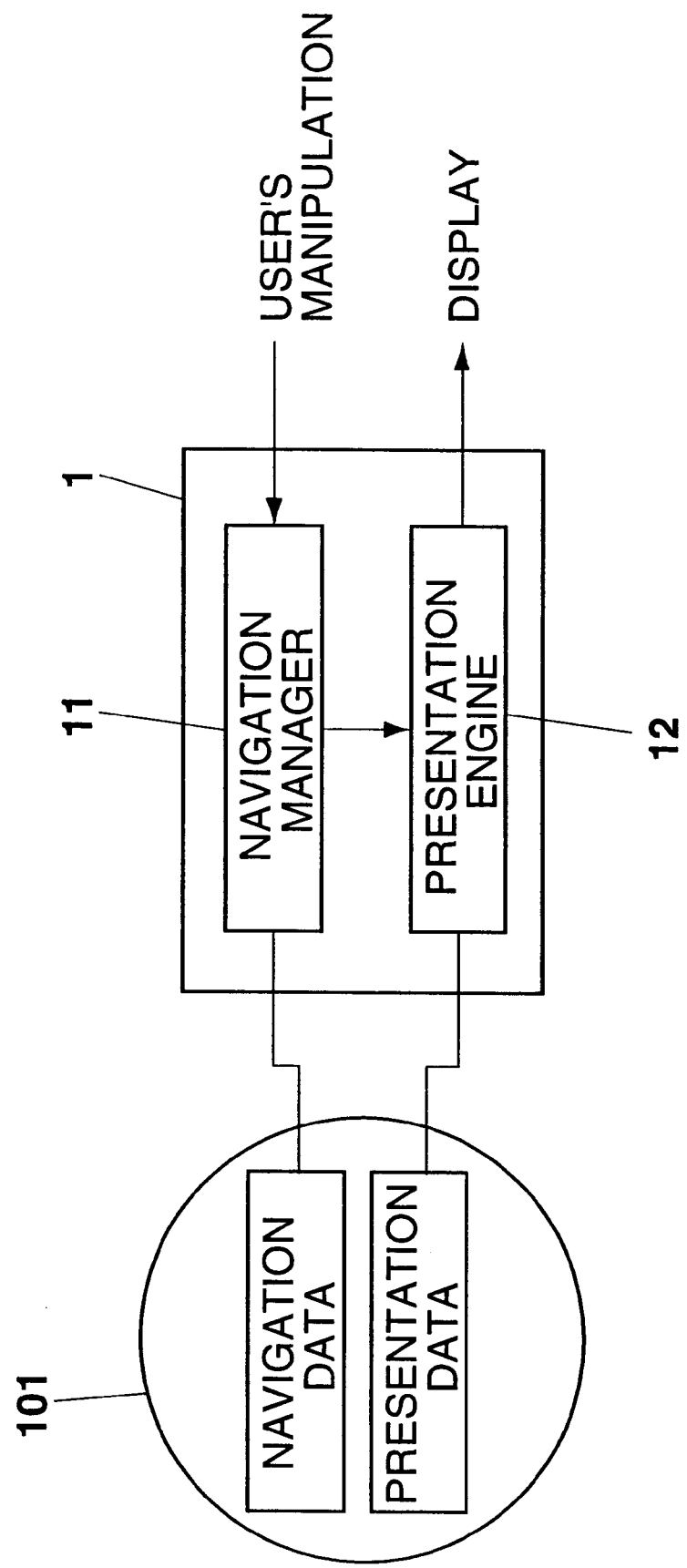
FIG. 1 is a block diagram showing an example configuration of a DVD player 1.
Figure 2:
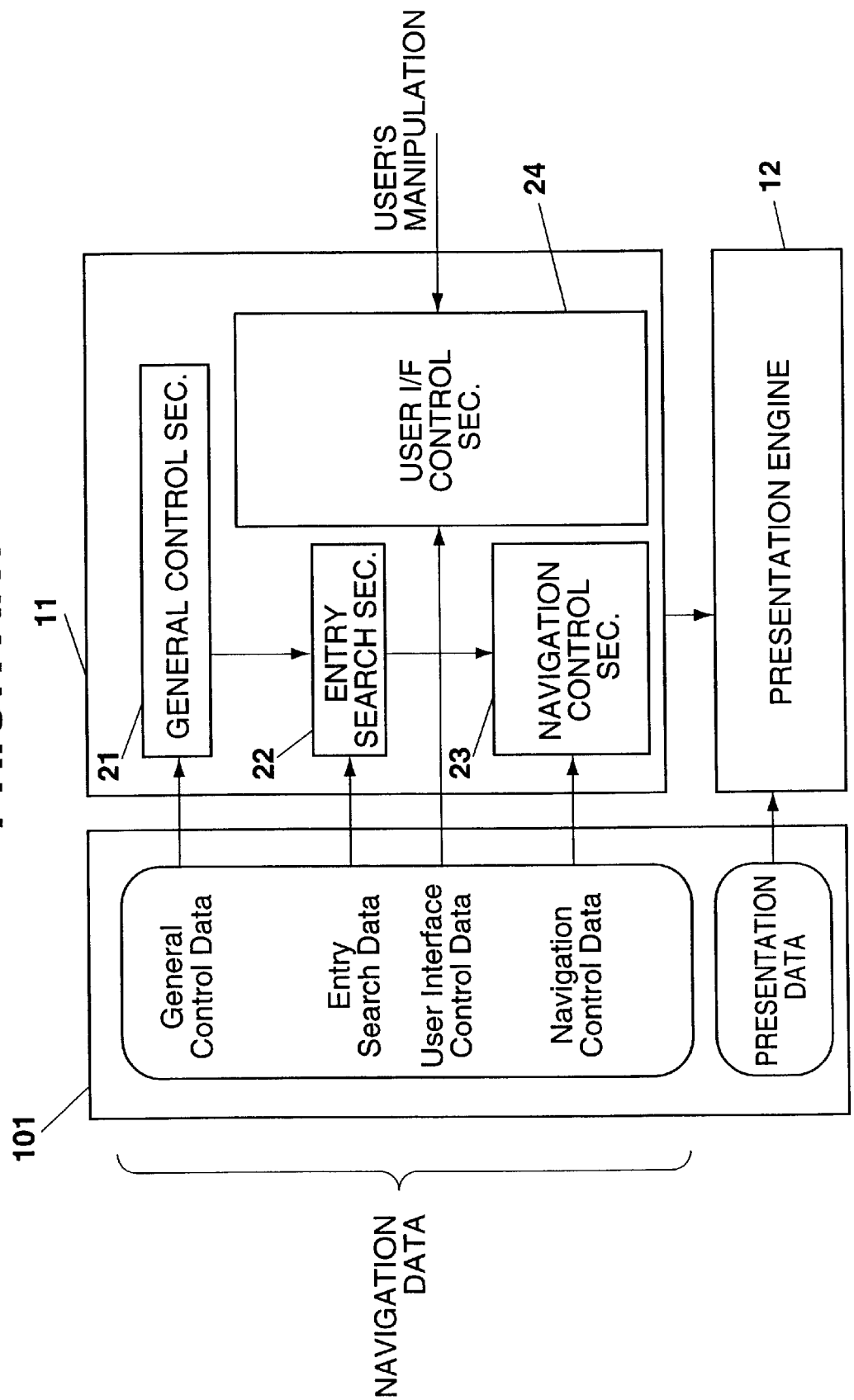
FIG. 2 shows an example configuration of a navigation manager 11 shown in FIG. 1.
Figure 3:
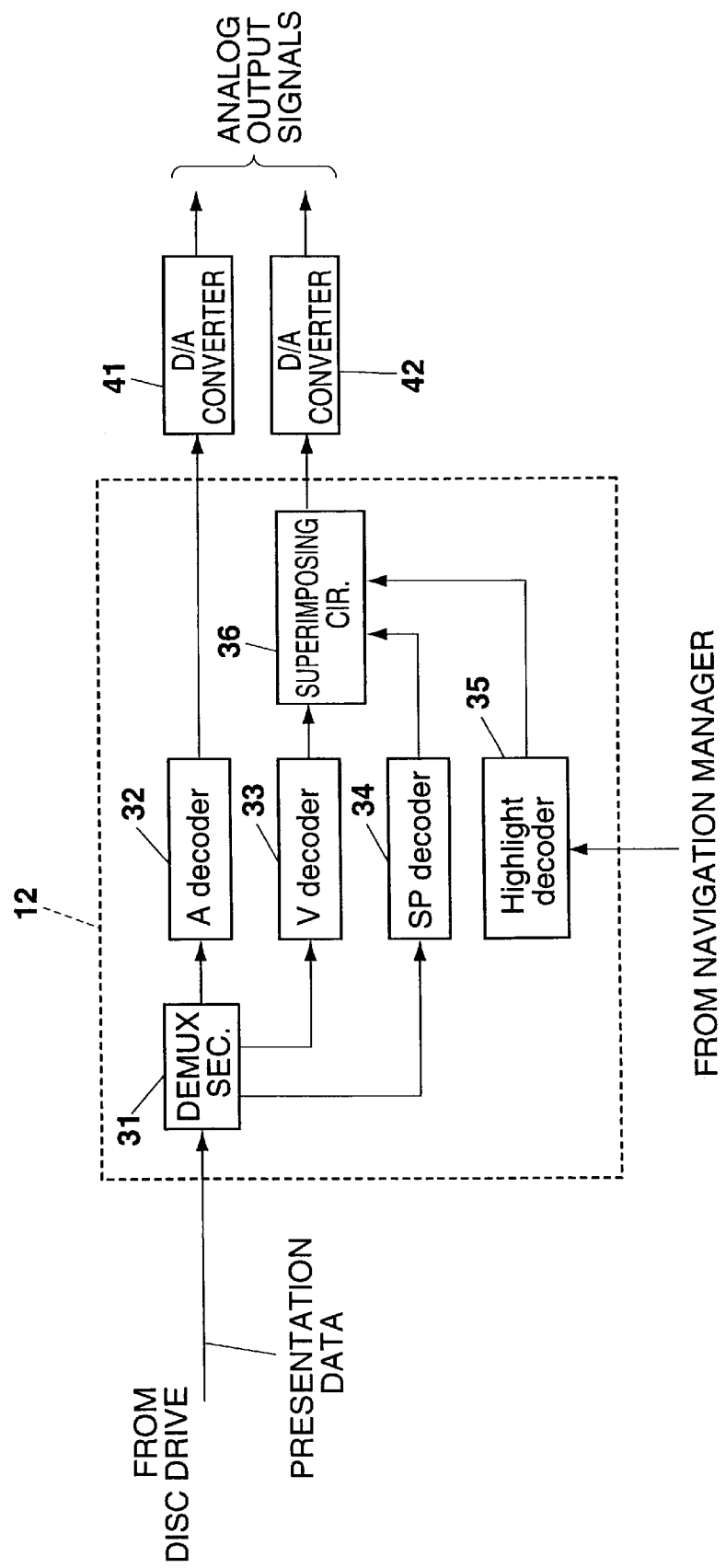
FIG. 3 shows an example configuration of a presentation engine 12 shown in FIG. 1.

The presentation engine 12, which is configured in the same manner as that shown in FIG. 3, outputs a digital video signal and a digital audio signal to a D/A converter 43 and a 1394 transmission/reception section 75B, respectively.

The 1394 transmission/reception section 75B transmits the supplied digital video and audio signals to the presentation device 63-1 by isochronous communication that is prescribed by the IEEE 1394 standard.

Since the navigation manager 11 and the D/A converter 43 are configured in the same manner as in the third embodiment, they will not be described here.

In the presentation device 63-1 of the fourth embodiment, a 1394 transmission/reception section 91B receives the digital video and audio signals transmitted from the DVD player 61 and outputs data thereof to a D/A converter 131.

The D/A converter 131 converts the supplied data into analog signals and outputs the analog signals.

Since a user interface sub-control section 97 is configured in the same manner as in the third embodiment, it is not described here.

Next, the operation of the fourth embodiment will be described.

First, in the DVD player 61 shown in FIG. 16, the disc drive 71 reads out presentation data as an MPEG program stream from the disc 101 and supplies it to the presentation engine 12 and supplies navigation data to the navigation manager 11.

Then, the presentation engine 12 reproduces a digital signal from the supplied presentation data according to settings of the navigation manager 11 and outputs the reproduced digital signal to the D/A converter 43 and the 1394 transmission/reception section 75B.

The 1394 transmission/reception section 75B transmits supplied digital video and audio signals to the presentation device 63-1 by isochronous communication that is prescribed by the IEEE 1394 standard.

In the presentation device 63-1, the 1394 transmission/reception section 91B receives the digital video and audio signals transmitted from the DVD player 61 and outputs data thereof to the D/A converter 131.

The D/A converter 131 converts the supplied data into analog signals and outputs the analog signals.

As described above, according to the fourth embodiment, converted data of the DVD player 61 is supplied to the presentation device 63-1 via the 1394 transmission/reception sections 75B and 91B that are interfaces prescribed by the IEEE 1394 standard, and converted into analog signals there.

Figure 17:
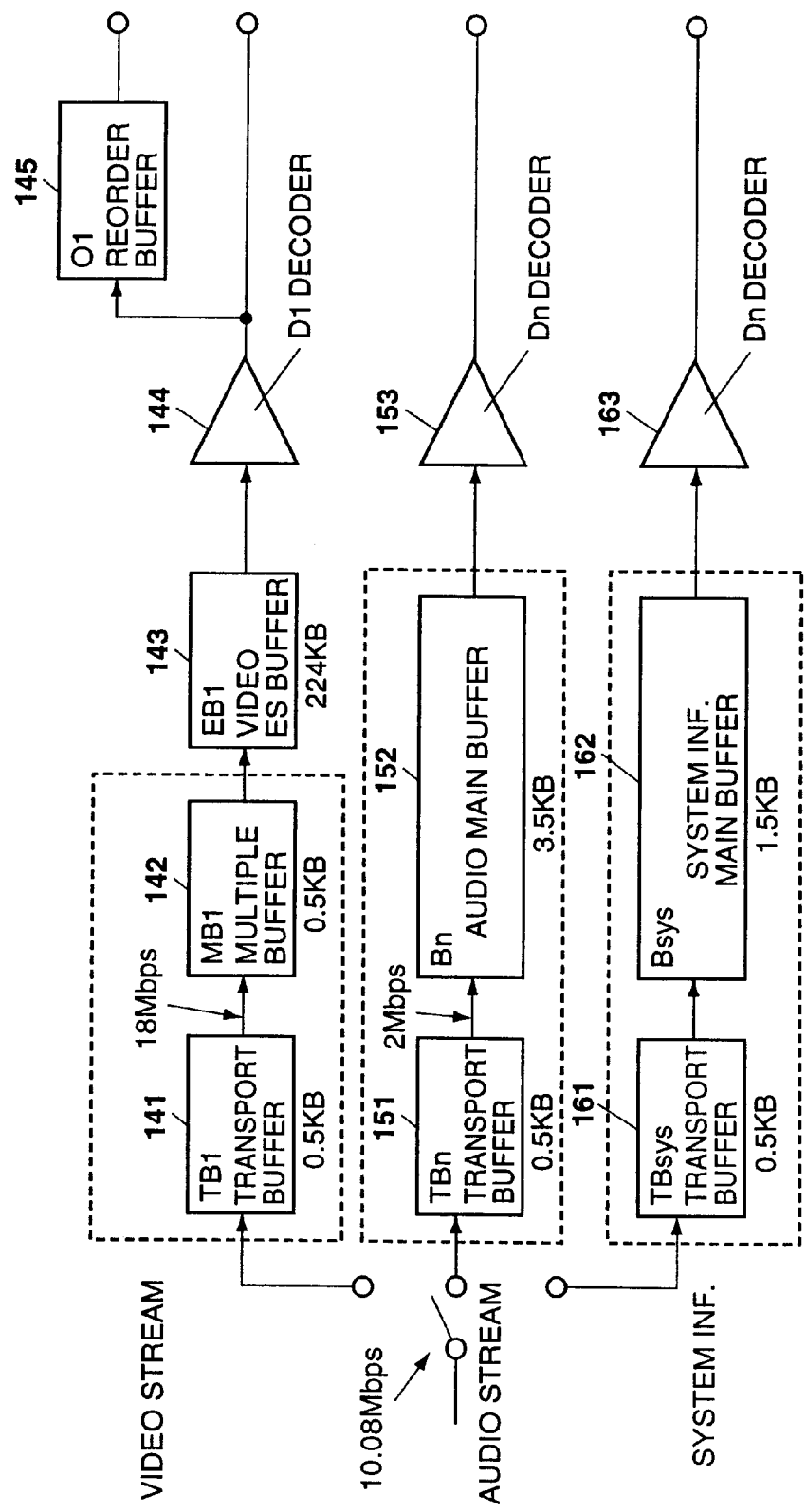
FIG. 17 shows a transport stream system target decoder model.

FIG. 17 shows an example configuration of a transport stream system target decoder model (T-STD: standard decoder). Based on a PID (packet identification) of a header portion of an input transport stream, a video stream is supplied to a decoder 144 via a transport buffer 141, a multiple buffer 142, and a video ES (elementary stream) buffer 143. The video stream is decoded by a decoder 144 and output therefrom. At this time, for display of a B-picture of the MPEG scheme, an I-picture and a P-picture are delayed by a reorder buffer 145.

An audio stream is supplied to a decoder 153 via a transport buffer 151 and an audio main buffer 152. The audio stream is decoded by the decoder 153 and output therefrom. System information (PSI (program specific information)) is supplied to a decoder 163 via a transport buffer 161 and a system information main buffer 162. The system information is decoded by the decoder 163 and output therefrom.

As for the basic process of the PS/TS conversion, first, a pack header is removed from each pack and a PES (packetized elementary stream) is divided into portions of 176 bytes (188 bytes–12 bytes) that corresponds to a payload of a transport stream (TS). At this time, for packet alignment, stuffing is effected at the last portion of each PES. Thereafter, each PES is packetized by adding a newly generated TS packet header to it.

Care should be taken to satisfy the above-described TSTD model so that a buffer of a decoder on the receiving side does not overflow or underflow. From the viewpoint of the buffer size, there occurs no problem because the T-STD model has the same or larger buffer size, as described below.

That is, video data is 32 (=8+24) Kbytes in the case of a program stream and is 234 (=0.5+9.5+224) Kbytes in the case of a transport stream. Audio data is 4 Kbytes in the case of a program stream and is also 4 Kbytes (=0.5+3.5) Kbytes in the case of a transport stream.

However, the buffer of the T-STD is internally divided into the transport buffer and the main buffer and a leak rate between these buffers may cause a problem. As shown in FIG. 17, while the input rate is 10.08 Mbps that is the maximum transfer rate of DVD-Video, in T-STD the leak rate of the video transport buffer 141 is 18 Mbps (MP@ML) and the leak rate of the audio transport buffer 151 is 2 Mbps. Therefore, there occurs no problem for the video because the leak rate of the transport buffer 141 is higher than its input rate.

However, in the audio transport buffer 151, since the leak rate (2 Mbps) is lower than the input rate (10.08 Mbps), the audio transport buffer 151 may overflow if data is transferred without making any measure. To avoid this problem, it is necessary to separate an audio stream, temporarily effect buffering on it, and then multiplex it with the other streams.

Figure 18:
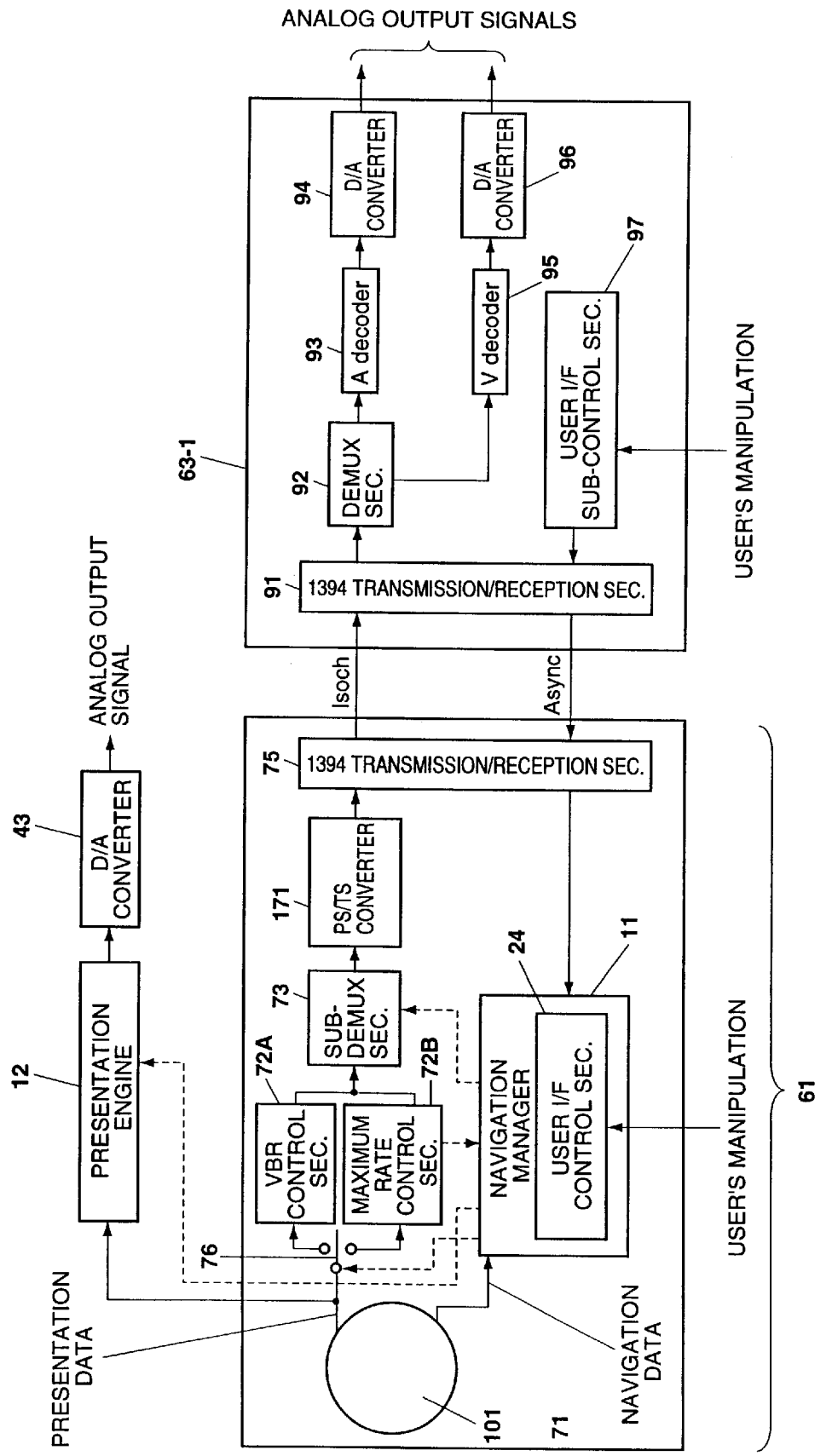
FIG. 18 is a block diagram showing internal configurations of the DVD player 61 and the presentation device 63-1 shown in FIG. 4 according to a fifth embodiment.

FIG. 18 shows internal configurations of the DVD player 61 and the presentation device 63-1 according to a fifth embodiment. Although not shown in FIG. 18, the presentation devices 63-2 and 63-3 are configured in the same manner as the presentation device 63-1.

In the embodiment shown in FIG. 18, presentation data read out from a disc 101 is supplied to either a VBR control section 72A or a maximum rate control section 72B via a switch 76. For example, when normal reproduction is designated by a user's manipulation, presentation data reproduced from the disc 101 is supplied to the VBR control section 72A via the switch 76. Since the configuration and the operation of the VBR control section 72A are the same as the VBR control section shown in FIG. 5, they are not described here.

On the other hand, when a trick play mode such as fast feed, reverse reproduction, or double speed reproduction is designated by a user's manipulation, information corresponding to the user's manipulation is supplied to a navigation manager 11 via a user interface control section 24. As a result, the navigation manager 11 detects entrance into a trick play mode and controls the switch 76 so that reproduction data from the disc 101 is supplied to the maximum rate control section 72B.

In outputting data that is supplied from the disc 101 via the switch 76, the maximum rate control section 72B performs a check so that a transfer rate that is secured in advance in the IEEE 1394 standard is not exceeded.

That is, if it is judged that the above-mentioned transfer rate will be exceeded, the maximum rate control section 72B supplies, via the navigation manager 11, an optical pickup (not shown) with a signal for instructing it to suspend reading from the disc 101. In response, the optical pickup stops data reading from the disc 101. When a transfer-possible state is restored, the maximum rate control section 72B supplies, via the navigation manager 11, the optical pickup with a signal for instructing it to restart the reading from the disc 101. In response, the optical pickup restarts the data reading from the disc 101. In this manner, the maximum rate control section 72B controls the rate so as to prevent a failure in the transmission line.

Figure 19:
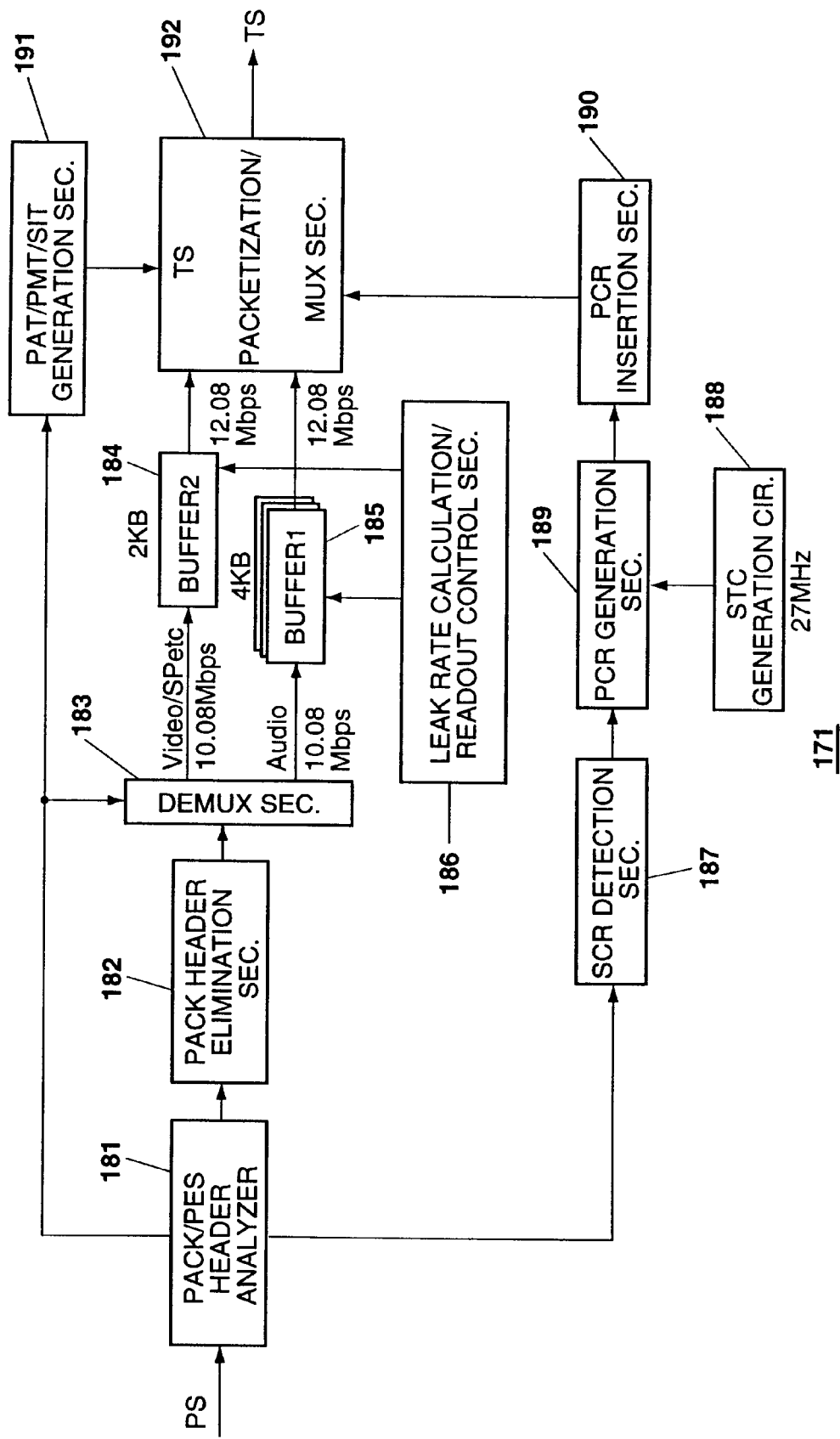
FIG. 19 is a block diagram showing an example configuration of a PS/TS converter 171.

FIG. 19 is a block diagram showing an example configuration of a PS/TS converter 171 (converting means) shown in FIG. 18. The internal configuration of the PS/TS converter 171 shown in FIG. 19 is also applicable to the above-described first and second embodiments, i.e., the PS/TS converters 74 and 98 shown in FIGS. 5 and 14, respectively.

A pack/PES header analyzer 181 is supplied with pack data of an MPEG-PS format that has been subjected to VBR control or maximum rate control. The pack/PES header analyzer 181 captures the pack data and stores it in a memory (not shown), and checks the content of a pack/PES header. The pack/PES header analyzer 181 detects a stream ID from each pack header to distribute audio data, video data, and sub-picture data based on the detected stream ID.

Further, the pack/PES header analyzer 181 supplies the stream ID and other data to a PAT (program association table)/PMT (program map table)/SIT (service information table) generation section 191.

A SCR (system clock reference) detection section 187 detects a SCR by analyzing a pack header of pack data that is supplied via the pack/PES header analyzer 181.

A PCR (program clock reference) generation section 189 generates a TS PCR by using a counter of 27 MHz that operates in a STC (system time clock) generation circuit 188 on a disc drive 71 side. STC initialization is performed by adding a fixed delay to a first-output SCR. Initialization is also effected when the STC is offset at the occurrence of a rush of a block such as an angle block, a block-out, or the like.

A pack header elimination section 182 eliminates a pack header to save the buffer capacity of the stage downstream of the demultiplexer 183 (separating means). The demultiplexer (DEMUX) 183 separates only an audio pack from pack data supplied from the pack header elimination section 182 and supplies it to a first buffer 185 (buffer1). The demultiplexer 183 supplies the remaining packs, i.e., a video pack, a sub-picture pack, and a navigation pack to a second buffer 184 (buffer2).

An audio stream is temporarily accepted by the first buffer 185 having a size of 4 Kbytes that is the PS audio buffer size. A leak rate calculation/readout control section 186 calculates the output rate of the first buffer 185 so that it becomes lower than or equal to 2 Mbps (leak rate of the transport buffer 151 of T_STD shown in FIG. 17), and controls the readout to a TS packetization block (TS packetization/MUX section) 192 (multiplexing means) in accordance with the calculated rate.

A PCR insertion section 190 supplies a TS packet header to the TS packetization block 192. The TS packetization block 192 attaches a TS packet header to each pack by using a default PID. FIG. 20 shows examples of contents of a header. FIG. 21 shows examples of PIDs for a DVD.

As shown in FIG. 20, the first 8 bits of a TS packet header are a sync byte (sync_byte) and "010000111" is set there. The next one bit is an error indicator (transport_error_indicator) and "0" or "1" is set there. The next one bit is a unit start indicator (payload_unit_start_indicator) and "0"

or "1" is set there. The next one bit indicates packet priority (transport_priority) and "0" or "1" is set there.

The next 13 bits are a PID and a value as shown in FIG. 18 is set there in accordance with the kind of packet. The next 2 bits indicates a scrambling control (transport_scrambling_control) and "00" is set there. The next 2 bits indicates an adaptation field control (adaptation_field_control) and "01" or "11" is set there. The next 4 bits are a continuity counter (continuity_counter) and information to be used to detect whether a packet having the same PID has been discarded halfway is set there.

In the case of an MPEG2-TS that does not include any adaptation field (hence there is no PCR), a TS packet header is constructed by the above 4 bytes. On the other hand, in the case of an MPEG2-TS that includes an adaptation field (hence there exists a PCR), the following information is set additionally. The first 8 bits of the adaptation field are an adaptation field length and "00000111" (=7) is set there. The next one bit is a discontinuity indicator (discontinuity_indicator) and "0" or "1" is set there.

The next one bit is a random access indicator (random_access_indicator) and "0" is set there. The next one bit is a stream priority indicator (ES_priority_indicator) and "0" is set there.

The next one bit is "PCR (program clock reference)_flag" and "1" is set there. The next one bit is "OPCR (original program clock reference)_flag" and "0" is set there. The next one bit is "splicing_point_flag" and "0" is set there. The next one bit is "transport_private_data_flag" and "0" is set there.

A PCR is set at the next 48 bits. More specifically, the first 33 bits are "program_clock_reference_flag," the next 6 bits are "reserved," i.e., a reserved region, and the last 9 bits are "PCR_extension."

As shown in FIG. 21, a video pack (VIDEO_PACK) is assigned a PID "0x0020" ("0x" indicates that "0020" is a hexadecimal number), and an audio pack (AUDIO_PACK) is assigned PIDs "0x0021" to "0x0028." A sub-picture pack (SP_PACK) is assigned PIDs "0x0029" to "0x0048." "PCI (program chain information)_PKT" is assigned a PID "0x0049," and "DSI (decoder system information_PKT" is assigned a PID "0x004a."

Although the user private area of the PIDs shown in FIG. 21 is "0x0010" to "0x1FFE," in view of the compatibility with the STB (set-top box) it is avoided to use the area "0x0010" to "0x0016" which is used by the STB; "0x0020" to "0x004a" are used for a DVD.

The PAT/PMT/SIT generation section 191 generates various tables such as a PAT, a PMT, a SIT and a DIT (discontinuity information table) based on a stream ID etc. detected from each pack header. The TS packetization block 192 multiplexes audio data from the first buffer 185, video data from the second buffer 184, sub-picture data, table information from the PAT/PMT/SIT generation section 191, and PCR etc. from the PCR insertion section 190, to thereby generate a transport stream packet.

Next, the operation of the fifth embodiment will be described. Only the operations of the portion relating to the maximum rate control section 72B and the PS/TS converter 171 will be described below because the other portion of the DVD player 61 operates basically in the same manner as in the first embodiment which was described above with reference to FIG. 5. The operations of the presentation device 63-1 to 63-3 will not be described below because they operate in the same manner as described above with reference to FIG. 5.

For example, when normal reproduction is designated by a user's manipulation, presentation data reproduced from the disc 101 is supplied to the VBR control section 72A via the switch 76. Since the configuration and the operation of the VBR control section 72A are the same as the VBR control section 72 shown in FIG. 5, they are not described here.

On the other hand, when a trick play mode such as fast feed, reverse reproduction, or double speed reproduction is designated by a user's manipulation, information corresponding to the user's manipulation is supplied to the navigation manager 11 via the user interface control section 24. As a result, the navigation manager 11 detects entrance into a trick play mode and controls the switch 76 and switches its internal connection so that reproduction data from the disc 101 is supplied to the maximum rate control section 72B.

In outputting MPEG2 format data that is supplied from the disc 101 via the switch 76, the maximum rate control section 72B performs a check so that a transfer rate (maximum rate) that is secured in advance in the IEEE 1394 is not exceeded.

That is, if it is judged that the maximum rate will be exceeded, the maximum rate control section 72B supplies, via the navigation manager 11, the optical pickup (not shown) with a signal for instructing it to suspend reading from the disc 101. In response, the optical pickup stops data reading from the disc 101. When a transfer-possible state is restored, the maximum rate control section 72B supplies, via the navigation manager 11, the optical pickup with a signal for instructing it to restart the reading from the disc 101. In response, the optical pickup restarts the data reading from the disc 101. In this manner, the maximum rate control section 72B controls the rate so as to prevent a failure in the transmission line.

The data that has been rate-controlled by the VBR control section 72A or the maximum rate control section 72B is supplied to the sub-DEMUX section 73, where unnecessary packs are eliminated. Resulting data is supplied to the PS/TS converter 171.

The data thus supplied to the PS/TS converter 171 is input to the pack/PES header analyzer 181. This data is pack data of an MPEG-PS format that has been subjected to the VBR control or the maximum rate control. The pack/PES header analyzer 181 captures this data and stores it in a memory (not shown), and checks the content of a pack/PES header. The pack/PES header analyzer 181 detects a stream ID from each pack header to distribute audio data, video data, and sub-picture data based on the detected stream ID.

Further, the stream ID and other data are supplied to the PAT/PMT/SIT generation section 191.

Also supplied with the pack data via the pack/PES header analyzer 181, the SCR detection section 187 detects a SCR by analyzing a pack header of the pack data. The detected SCR is supplied to the PCR generation section 189.

The PCR generation section 189 generates a TS PCR by using a counter of 27 MHz that operates in the STC generation circuit 188 on the disc drive 71 side. STC initialization is performed by adding a fixed delay to a first-output SCR. Initialization is also effected when the STC is offset at the occurrence of a rush of a block such as an angle block, a block-out, or the like.

The pack header elimination section 182 eliminates a pack header from the pack data supplied from the pack/PES header analyzer 181 to save the buffer capacity of the stage downstream of the demultiplexer 183. The remaining data is supplied to the demultiplexer (DEMUX) 183. The demultiplexer 183 separates only an audio pack from pack data supplied from the pack header elimination section 182 and supplies it to the first buffer 185 (buffer1). The remaining packs, i.e., a video pack, a sub-picture pack, and a navigation pack are supplied to the second buffer 184 (buffer2).

An audio stream is temporarily accepted by the first buffer 185 having a size of 4 Kbytes that is the PS audio buffer size. The leak rate calculation/readout control section 186 calculates the output rate of the first buffer 185 so that it becomes lower than or equal to 2 Mbps, and controls the readout to the TS packetization block (TS packetization/MUX section) 192 in accordance with the calculated rate.

The output-timing-controlled audio data will be converted into a TS packet and again multiplexed with the other streams (video data etc.). If the other streams are delayed for this multiplexing, there arises a possibility that the decoder side video buffer underflows. In view of this, the rate after the multiplexing is determined to 12.08 (=10.08+2.0) Mbps in consideration of the audio leak rate.

Therefore, the TS packetization block 192 also receives, via the second buffer 185, video data and other streams (for instance, sub-picture data) and multiplexes those data with such timing that no collision occurs with audio packs. At this time, since the output rate is increased by the audio leak rate as described above, transfers of video data and other data are not delayed.

The final transfer rate after the TS conversion is increased by a value of redundancy corresponding to addition of a TS packet header and table information such as a PAT, a PMT, and a SIT.

Since the above process for audio data is necessary for each audio stream, buffers of 32 Kbytes (=4 Kbytes×8) are needed at the maximum, i.e., in outputting all audio streams.

The PCR insertion section 190 supplies a TS packet header to the TS packetization block 192. A PCR is attached once per at least 100 milliseconds, as prescribed in the MPEG2-TS standard.

The TS packetization block 192 attaches a TS packet header to each pack by using a default PID. The PAT/PMT/SIT generation section 191 generates various tables such as a PAT, a PMT, a SIT, and a DIT (discontinuity information table) based on a stream ID etc. detected from each pack header, and these tables are supplied to the TS packetization block 192. The TS packetization block 192 multiplexes audio data from the first buffer 185, video data from the second buffer 184, sub-picture data, table information from the PAT/PMT/SIT generation section 191, and PCR etc. from the PCR insertion section 190, to thereby generate a transport stream packet.

In the above manner, program stream type MPEG data is converted into transport stream type MPEG data in the PS/TS converter 171 and output therefrom. At this time, audio data and other data such as video data and sub-picture data are temporarily stored in the respective buffers (buffer1 and buffer2) and again multiplexed so as not to cause the decoder side audio buffer to overflow. Therefore, even when the input rate is 10.08 Mbps, sound can be reproduced without interruption.

The invention is not limited to the above embodiments, and can be applied to other apparatuses and systems.

Further, specific numerical values appearing in the above embodiments are merely examples and the invention is not limited to those values.

As described above, in the data decoding system and the data decoding method according to the invention, the first device converts data of a first form into data of a second form and then transmits the data of the second form, or the second device receives the data of the first form and converts it into data of a second form, and the second device decodes the data of the second form. Therefore, data recorded on a DVD can be reproduced by using a device having a decoder suitable for processing of a transport stream.

In the data decoding system according to the invention, the first device reproduces data recorded on a given recording medium and transfers the reproduced data via an IEEE 1394 interface, and the plurality of second devices receive the data transferred via the IEEE 1394 interface and perform digital-to-analog conversion on the received data, to output an analog signal. Therefore, data recorded on a DVD can be reproduced.

In the transfer device and the transfer method according to the invention, data of a first form is converted into data of a second form that is a data form in a decoder, and the data of the second form is transferred. Therefore, data recorded on a DVD can be reproduced by using a device having a decoder suitable for processing of a transport stream.

In the receiving device and the receiving method according to the invention, data of a first form is received, the data of the first form is converted into data of a second form that is a data form in a decoder, and the data of the second form is decoded. Therefore, data recorded on a DVD can be reproduced.

In the receiving device and the receiving method according to the invention, data of a first form or a second form is received and supplied to the first decoding section or the second decoding section in accordance with a form of the received data. The first decoding means decodes the data of the first form, or the second decoding means decodes the data of the second form. Therefore, data recorded on a DVD can be reproduced.

What is claimed is:

1. A data decoding system comprising:
   a first device for transferring encoded data via a digital interface configured according to a predetermined format using isochronous and asynchronous transferring packet;
   a second device for receiving the data transferred via the digital interface and for decoding the received data for a given data form, said second device including:
   a variable rate control section for receiving a reproduction signal from the first device and for outputting it with given timing;
   a maximum rate control section for receiving a reproduction signal from the first device and for checking an output rate of the maximum rate control section so that the output rate does not exceed a transfer rate of the digital interface;
   a switch for selectively supplying reproduction data to the variable rate control section or the maximum rate control section in accordance with a playback state of the first device, and wherein:
   the first device or the second device comprises converting means for converting data of a first form that is supplied form the variable rate control section or the maximum rate control section into data of a second form; and
   the second device decodes the data of the second form.

2. The data decoding system according to claim 1, wherein the first form is a program stream of an MPEG scheme and the second form is a transport stream of the MPEG scheme.

3. The data decoding system according to claim 2, wherein the converting means further comprises multiplexing means for multiplexing the audio data and the data other than the audio data to generate an MPEG transport stream.

4. The data decoding system according to claim 1, wherein the converting means comprises a buffer for temporarily storing the data of the first form.

5. The data decoding system according to claim 4, wherein the converting means further comprises separating means for separating the data of the first form into audio data and data other than the audio data, and wherein the buffer is constituted of a buffer for temporarily storing the audio data and a buffer for temporarily storing the data other than the audio data.

6. The data decoding system according to claim 5, wherein the converting means comprises buffers for temporarily storing the audio data in the number of streams of the audio data.

7. The data decoding system according to claim 6, wherein each of the buffers for temporarily storing the audio data has a capacity of 4 kilobytes.

8. A data decoding method in a data decoding system having a first device for transferring encoded data via a digital interface configured according to a predetermined format using isochronous and asynchronous transferring packet, and a second device for receiving the data transferred via the digital interface and for decoding the received data said second device including:

a variable rate control section for receiving a reproduction signal from the first device and for outputting it with given timing;

a maximum rate control section for receiving a reproduction signal from the first device and for checking an output rate of the maximum rate control section so that the output rate does not exceed a transfer rate of the digital interface;

a switch for selectively supplying reproduction data to the variable rate control section or the maximum rate control section in accordance with a playback state of the first device, wherein:

the first device converts data of a first form that is supplied form the variable rate control section or the maximum rate control section into data of a second form and then transmits the data of the second form, or the second device receives the data of the first form and converts it into data of a second form; and the second device decodes the data of the second form.

9. The data decoding method according to claim 8, wherein the first form is a program stream of an MPEG scheme and the second form is a transport stream of the MPEG scheme.

10. The data decoding method according to claim 9, wherein in converting the data of the first form, the first or second device multiplexes the audio data and the data other than the audio data to generate an MPEG transport stream.

11. The data decoding method according to claim 8, wherein the first or second device temporarily stores the data of the first form in converting it.

12. The data decoding method according to claim 11, wherein in converting the data of the first form, the first or second device separates the data of the first form into audio data and data other than the audio data, and then stores temporarily and separately the audio data and the data other than the audio data.

13. The data decoding method according to claim 12, wherein in converting the data of the first form, the first or second device stores the audio data in the number of streams.

14. A transfer device for transferring, via a digital interface configured according to a predetermined format using isochronous and asynchronous transferring packet, encoded data to a decoder that decodes the encoded data for a given data form, comprising:

a variable rate control section for receiving a reproduction signal from the first device and for outputting it with given timing;

a maximum rate control section for receiving a reproduction signal from the first device and for checking an output rate of the maximum rate control section so that the output rate does not exceed a transfer rate of the digital interface;

a switch for selectively supplying reproduction data to the variable rate control section or the maximum rate control section in accordance with a playback state of the first device converting means for converting data of a first form that is supplied form the variable rate control section or the maximum rate control section into data of a second form that is the given data form in the decoder; and transferring means for transferring the data of the second form.

15. The transfer device according to claim 14, wherein the first form is a program stream of an MPEG scheme and the second form is a transport stream of the MPEG scheme.

16. The transfer device according to claim 15, wherein the converting means further comprises multiplexing means for multiplexing the audio data and the data other than the audio data to generate an MPEG transport stream.

17. The transfer device according to claim 14, wherein the converting means comprises a buffer for temporarily storing the data of the first form.

18. The transfer device according to claim 17, wherein the converting means further comprises separating means for separating the data of the first form into audio data and data other than the audio data, and wherein the buffer is constituted of a buffer for temporarily storing the audio data and a buffer for temporarily storing the data other than the audio data.

19. The transfer device according to claim 18, wherein the converting means comprises buffers for temporarily storing the audio data in the number of streams of the audio data.

20. The transfer device according to claim 19, wherein each of the buffers for temporarily storing the audio data has a capacity of 4 kilobytes.

21. The transfer device according to claim 14, wherein the digital interface is configured according to an IEEE 1394 format.

22. The transfer device according to claim 14, wherein the data of the first form is data reproduced from a digital versatile disc.

23. A transfer device for transferring, via a digital interface configured according to a predetermined format using isochronous and asynchronous transferring packet, encoded data to a decoder that decodes the encoded data for a given data form, comprising the steps of:

a variable rate control section for receiving a reproduction signal from the first device and for outputting it with given timing;

a maximum rate control section for receiving a reproduction signal from the first device and for checking an output rate of the maximum rate control section so that the output rate does not exceed a transfer rate of the digital interface;

a switch for selectively supplying reproduction data to the variable rate control section or the maximum rate control section n accordance with a playback state of the first device converting data of a first form that is supplied form the variable rate control section or the maximum rate control section into data of a second form that is the given data form in the decoder; and transferring the data of the second form.

24. The transfer method according to claim 23, wherein the first form is a program stream of an MPEG scheme and the second form is a transport stream of the MPEG scheme.

25. The transfer method according to claim 24, wherein the converting step comprises multiplexing the audio data and the data other than the audio data to generate an MPEG transport stream.

26. The transfer method according to claim 23, wherein the converting step comprises temporarily storing the data of the first form.

27. The transfer method according to claim 26, wherein the converting step comprises separating the data of the first form into audio data and data other than the audio data, and storing temporarily and separately the audio data and the data other than the audio data.

28. The transfer method according to claim 27, wherein the converting step comprises storing the audio data in the number of streams.

29. The transfer method according to claim 23, wherein the digital interface is configured according to an IEEE 1394 format.

30. The transfer method according to claim 23, wherein the data of the first form is data reproduced from a digital versatile disc.

31. A receiving device in a data decoding system for receiving encoded data transferred via a digital interface configured according to a predetermined format using isochronous and asynchronous transferring packet and for decoding the received data for a given data form, the receiving device comprising:

receiving means for receiving data of a first form;
a variable rate control section for receiving a reproduction signal from the first device and for outputting it with given timing;
a maximum rate control section for receiving a reproduction signal from the first device and for checking an output rate of the maximum rate control section so that the output rate does not exceed a transfer rate of the digital interface;
a switch for selectively supplying reproduction data to the variable rate control section or the maximum rate control section in accordance with a playback state of the first device:
converting means for converting the data of the first form that is supplied form the variable rate control section or the maximum rate control section into data of a second form that is the given data form; and
decoding means for decoding the data of the second form.

32. The receiving device according to claim 31, wherein the first form is a program stream of an MPEG scheme and the second form is a transport stream of the MPEG scheme.

33. The receiving device according to claim 32, wherein the converting means further comprises multiplexing means for multiplexing the audio data and the data other than the audio data to generate an MPEG transport stream.

34. The receiving device according to claim 31, wherein the digital interface is configured according to an IEEE 1394 format.

35. The receiving device according to claim 31, wherein the converting means comprises a buffer for temporarily storing the data of the first form.

36. The receiving device according to claim 35, wherein the converting means further comprises separating means for separating the data of the first form into audio data and data other than the audio data, and wherein the buffer is constituted of a buffer for temporarily storing the audio data and a buffer for temporarily storing the data other than the audio data.

37. The receiving device according to claim 36, wherein the converting means comprises buffers for temporarily storing the audio data in the number of streams of the audio data.

38. The receiving device according to claim 37, wherein each of the buffers for temporarily storing the audio data has a capacity of 4 kilobytes.

39. A receiving method in a data decoding system for receiving encoded data transferred via a digital interface configured according to a predetermined format using isochronous and asynchronous transferring packet and for decoding the received data for a given data form, the receiving method comprising the steps of:

receiving data of a first form;
a variable rate control section for receiving a reproduction signal from the first device and for outputting it with given timing;
a maximum rate control section for receiving a reproduction signal from the first device and for checking an output rate of the maximum rate control section so that the output rate does not exceed a transfer rate of the digital interface;
a switch for selectively supplying reproduction data to the variable rate control section or the maximum rate control section in accordance with a playback state of the first device
converting data of the first form that is supplied form the variable rate control section or the maximum rate control section into data of a second form that is the given data form; and
decoding the data of the second form.

40. The receiving method according to claim 39, wherein the first form is a program stream of an MPEG scheme and the second form is a transport stream of the MPEG scheme.

41. The receiving method according to claim 40, wherein the converting step comprises multiplexing the audio data and the data other than the audio data to generate an MPEG transport stream.

42. The receiving method according to claim 39, wherein the converting step comprises temporarily storing the data of the first form.

43. The receiving method according to claim 42, wherein the converting step comprises separating the data of the first form into audio data and data other than the audio data, and storing temporarily and separately the audio data and the data other than the audio data.

44. The receiving method according to claim 43, wherein the converting step comprises storing the audio data in the number of streams.

45. The receiving method according to claim 39, wherein the digital interface is configured according to an IEEE 1394 format.

46. The receiving method according to claim 39, wherein the data of the first form is data reproduced from a digital versatile disc.

47. A receiving device in a data decoding system for receiving encoded data transferred via a digital interface configured according to a predetermined format using isochronous and asynchronous transferring packet and for decoding the received data for a given data form, the receiving device comprising:

first decoding means for decoding data of a first form;

second decoding means for decoding data of a second form;

a variable rate control section for receiving a reproduction signal from the first device and for outputting it with given timing;

a maximum rate control section for receiving a reproduction signal from the first device and for checking an output rate of the maximum rate control section so that the output rate does not exceed a transfer rate of the digital interface;

a switch for selectively supplying reproduction data to the variable rate control section or the maximum rate control section in accordance with a playback state of the first device and supplying means for receiving the data of the first or second form and for supplying the received data to the first decoding means or the second decoding means in accordance with a form of the received data.

48. The receiving device according to claim 47, wherein the first form is a program stream of an MPEG scheme and the second form is a transport stream of the MPEG scheme.

49. A recording medium playback device for transferring, via a digital interface configured according to a predetermined format using isochronous and asynchronous transferring packets, encoded data that is read out from a recording medium to a decoder that decodes the encoded data for a given data form, comprising:

a variable rate control section for receiving a reproduction signal from the recording medium and for outputting it with given timing;

a maximum rate control section for receiving a reproduction signal from the recording medium and for checking an output rate of the maximum rate control section so that the output rate does not exceed a transfer rate of the digital interface;

a switch for selectively supplying reproduction data to the variable rate control section or the maximum rate control section in accordance with a playback state of the recording medium;

converting means for converting data of a first form that is supplied form the variable rate control section or the maximum rate control section into data of a second form that is the given data form in the decoder; and transferring means for transferring the data of the second form.

50. The recording medium playback device according to claim 49, wherein the switch is controlled so as to supply the reproduction data to the variable rate control section when a mode for normally playing back the recording medium is selected, and to the maximum rate control section when a trick play mode is selected.

51. The recording medium playback device according to claim 49, wherein the first form is a program stream of an MPEG scheme and the second form is a transport stream of the MPEG scheme.

52. The recording medium playback device according to claim 51, wherein the converting means further comprises multiplexing means for multiplexing the audio data and the data other than the audio data to generate an MPEG transport stream.

53. The recording medium playback device according to claim 49, wherein the converting means comprises a buffer for temporarily storing the data of the first form.

54. The recording medium playback device according to claim 53, wherein the converting means further comprises separating means for separating the data of the first form into audio data and data other than the audio data, and wherein the buffer is constituted of a buffer for temporarily storing the audio data and a buffer for temporarily storing the data other than the audio data.

55. The recording medium playback device according to claim 54, wherein the converting means comprises buffers for temporarily storing the audio data in the number of streams of the audio data.

56. The recording medium playback device according to claim 55, wherein each of the buffers for temporarily storing the audio data has a capacity of 4 kilobytes.

57. The recording medium playback device according to claim 49, wherein the digital interface is configured according to an IEEE 1394 format.

58. The recording medium playback device according to claim 49, wherein the data of the first form is data reproduced from a digital versatile disc.

59. A data decoding system comprising:

a first device for transferring encoded data via a digital interface and for transferring the reproduced data via an interface configured according to a predetermined format using isochronous and asynchronous transferring packet; and a plurality of second devices for receiving the data transferred via the interface and for performing digital-to-analog conversion on the received data, to output an analog signaled second device including:

a variable rate control section for receiving a reproduction signal from the first device and for outputting it with given timing;

a maximum rate control section for receiving a reproduction signal from the first device and for checking an output rate of the maximum rate control section so that the output rate does not exceed a transfer rate of the digital interface;

a switch for selectively supplying reproduction data to the variable rate control section or the maximum rate control section in accordance with a playback state of the first device.

60. A receiving method in a data decoding system for receiving encoded data transferred via a digital interface and for decoding the received data for a given data form, the receiving method comprising the steps of:

receiving data of a first form or a second form and for supplying the received data to a first decoding section or a second decoding section in accordance with a form of the received data;

decoding the data of the first form in the first decoding section; and decoding the data of the second form in the second decoding section.

\* \* \* \* \*